(12) United States Patent
Nishihara et al.

(10) Patent No.: US 8,300,185 B2
(45) Date of Patent: Oct. 30, 2012

(54) LIQUID CRYSTAL DISPLAY

(75) Inventors: Yusuke Nishihara, Osaka (JP); Iori Aoyama, Osaka (JP); Tokio Taguchi, Osaka (JP); Akihiro Yamamoto, Osaka (JP); Masumi Kubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 187 days.

(21) Appl. No.: 12/743,935

(22) PCT Filed: Nov. 21, 2008

(86) PCT No.: PCT/JP2008/003444
§ 371 (c)(1),
(2), (4) Date: May 20, 2010

(87) PCT Pub. No.: WO2009/066474
PCT Pub. Date: May 28, 2009

(65) Prior Publication Data
US 2010/0283947 A1   Nov. 11, 2010

(30) Foreign Application Priority Data
Nov. 22, 2007 (JP) ................................. 2007-302635

(51) Int. Cl.
*G02F 1/1335* (2006.01)
(52) U.S. Cl. .............................. 349/112; 349/96; 349/56
(58) Field of Classification Search .................... 349/56, 349/96, 112, 113, 116, 114, 136, 97, 98, 349/99, 102, 103; 360/123, 125
See application file for complete search history.

(56) References Cited

U.S. PATENT DOCUMENTS
5,481,385 A    1/1996    Zimmerman et al.
(Continued)

FOREIGN PATENT DOCUMENTS
CN    1126520 A    7/1996
(Continued)

OTHER PUBLICATIONS

English translation of Official Communication issued in corresponding International Application PCT/JP2008/003444, mailed on Jun. 17, 2010.

(Continued)

*Primary Examiner* — Brian Healy
(74) *Attorney, Agent, or Firm* — Keating & Bennett, LLP

(57) ABSTRACT

A liquid crystal display device of the present invention includes: a liquid crystal display panel; and first and second light diffusing layers, each of which has a first major surface and a second major surface and each of which is arranged such that the first major surface opposes a viewer side surface of the liquid crystal display panel. Each of the first and second light diffusing layers includes a first region formed of a first substance which has a first refractive index $N_1$ and a plurality of second regions formed of a second substance which has a second refractive index $N_2(<N_1)$. The plurality of second regions are arranged in the first region at a predetermined pitch P in one direction in a plane parallel to the second major surface. Each of the plurality of second regions forms a plurality of interfaces with the first region, the interfaces being inclined by $\alpha°$ from the normal of the second major surface. The first light diffusing layer is closer to the liquid crystal display panel than the second light diffusing layer is. The plurality of second regions of the first light diffusing layer are arranged in a stripe pattern along a horizontal direction of the liquid crystal display panel. According to the present invention, the light diffusing layers that utilize total reflection are used to improve the viewing angle characteristics of a direct-viewing type liquid crystal display device.

12 Claims, 12 Drawing Sheets

U.S. PATENT DOCUMENTS

| | | | |
|---|---|---|---|
| 6,661,488 B1 | 12/2003 | Takeda et al. | |
| 6,822,792 B2 | 11/2004 | Goto | |
| 8,154,692 B2* | 4/2012 | Nishihara et al. | 349/112 |
| 2005/0213245 A1* | 9/2005 | Katsura et al. | 360/125 |
| 2010/0245737 A1* | 9/2010 | Aoyama et al. | 349/112 |
| 2010/0245738 A1* | 9/2010 | Nishihara et al. | 349/112 |
| 2010/0283947 A1* | 11/2010 | Nishihara et al. | 349/112 |

FOREIGN PATENT DOCUMENTS

| | | |
|---|---|---|
| CN | 1385754 A | 12/2002 |
| JP | 09-127309 A | 5/1997 |
| JP | 2003-050307 A | 2/2003 |
| JP | 2003-066206 A | 3/2003 |
| JP | 2006-084876 A | 3/2006 |

OTHER PUBLICATIONS

Official Communication issued in International Patent Application No. PCT/JP20081003444, mailed on Feb. 24, 2009.

Aoyama et al., "Light Diffusion Sheet and Liquid Crystal Display Device," U.S. Appl. No. 12/681,414, filed Apr. 2, 2010.

Nishihara et al., "Light Diffusion Sheet and Liquid Crystal Display Device," U.S. Appl. No. 12/681,411, filed Apr. 2, 2010.

Nishihara et al., "Liquid Crystal Display Device," U.S. Appl. No. 12/743,930, filed May 20, 2010.

* cited by examiner (a)

RIGHTWARD AND LEFTWARD DIRECTIONS (b)

UPWARD AND DOWNWARD DIRECTIONS (c)

DIAGONAL 45° DIRECTION (d)

DIAGONAL 135° DIRECTION (a)

RIGHTWARD AND LEFTWARD DIRECTIONS (b)

UPWARD AND DOWNWARD DIRECTIONS (c)

DIAGONAL 45° DIRECTION (d)

DIAGONAL 135° DIRECTION

LIQUID CRYSTAL DISPLAY

TECHNICAL FIELD

The present invention relates to a liquid crystal display device and specifically to a direct-viewing type liquid crystal display device which has a light diffusing layer on the viewer side of a liquid crystal display panel.

BACKGROUND ART

Liquid crystal display devices are not self-emitting display devices and, therefore, almost all of them, excluding some reflection-type display devices, require a backside illuminator (so called "backlight unit") for supplying light for display to the liquid crystal display panel. The backlight units, which are to be provided on the backside of the liquid crystal display panel (opposite to the viewer side), are generally classified into edge light type backlights and direct lighting type backlights. The edge light type is a class of backlights in which light emitted by a light source (CCFT (Cold Cathode Fluorescent Tube) or LED) placed on a side face of a light guide plate is allowed to propagate in the light guide plate and to outgo toward the liquid crystal display panel side. The direct lighting type backlights are configured such that a plurality of light sources are arranged on the back surface of a liquid crystal display panel, and light emitted by the light sources enters the liquid crystal display panel without passing through a light guide plate.

The liquid crystal display devices have a problem that the appearance of display varies depending on the viewing direction, i.e., a problem that the viewing angle characteristics degrade depending on the viewing direction. This results from the fact that the liquid crystal layer has anisotropy in refractive index so that the effective phase difference (retardation) of the liquid crystal layer varies depending on the viewing direction.

One of the known methods for improving the viewing angle characteristics of liquid crystal display devices is controlling the directivity (degree of parallelism) of light from the backlight such that rays which do not adversely affect the viewing angle characteristics are mainly allowed to enter the liquid crystal display panel and omniazimuthally diffusing the rays transmitted through the liquid crystal display panel by means of a microlens or microlens array (e.g., Patent Document 1).

[Patent Document 1] Japanese Laid-Open Patent Publication No. H9-127309

[Patent Document 2] Japanese Laid-Open Patent Publication No. 2003-50307

[Patent Document 3] Japanese Laid-Open Patent Publication No. H11-242225

DISCLOSURE OF INVENTION

Problems to be Solved by the Invention

However, when the above-described microlens is used, in any of a microlens which has a concave/convex pattern in its outer surface and a microlens which has a refractive index distribution of a predetermined shape in a planer layer (sometimes called "planer microlens"), there are difficulty in controlling the shape of the lens, difficulty in precisely controlling the ratio between the thickness of a convex portion of the lens and the thickness of an adhesive layer, and/or difficulty in controlling the distribution of light beams with high accuracy. Especially, a lens which has a concave/convex pattern in its outer surface is difficult to uniformly adhere to a display panel with high accuracy, and also has a problem that the lens characteristics vary depending on the size and shape of part of the lens which is buried in the adhesive layer. Therefore, the lens of this type has not been put to practice. Also, there is a problem that rearward scattering at the interface of the lens cannot be eliminated.

On the other hand, a light diffusion sheet which utilizes total reflection has been known (Patent Document 2). The light diffusion sheet disclosed in Patent Document 2 is a diffusion sheet for use in a rear projection type display device. This diffusion sheet is configured to diffuse highly-collimated image light that comes out of a display panel.

The present inventor examined, with the view of widening the viewing angle of a direct-viewing type liquid crystal display device, a configuration in which a light diffusing layer that utilizes total reflection is provided on the viewer side of a direct-viewing type liquid crystal display panel, and found a problem that an overlapping image and a local chromaticity change (a blue shift in chromaticity at a certain polar angle) in the polar angle dependence of the viewing angle characteristics are visually perceived. This problem is specific to a case where the light diffusing layer is applied to the direct-viewing type. Note that the "light diffusing layer which utilizes total reflection" does not mean that the light diffusing layer utilizes only total reflection but that the light diffusing layer utilizes at least total reflection. Light used for display includes total reflection and other types of reflections.

The present invention was conceived for the purpose of solving the above problems. One of the major objects of the invention is to improve the viewing angle characteristics of direct-viewing type liquid crystal display devices by using a light diffusing layer which utilizes total reflection.

Means for Solving the Problems

A liquid crystal display device of the present invention includes: a liquid crystal display panel which has a pair of polarizing plates; and first and second light diffusing layers, each of which has a first major surface and a second major surface opposing each other and each of which is arranged such that the first major surface opposes a viewer side surface of the liquid crystal display panel, wherein each of the first and second light diffusing layers includes a first region formed of a first substance which has a first refractive index $N_1$ and a plurality of second regions formed of a second substance which has a second refractive index $N_2$, the second refractive index $N_2$ being smaller than the first refractive index $N_1$, the plurality of second regions are arranged in the first region at a predetermined pitch P in one direction in a plane parallel to the second major surface, and each of the plurality of second regions forms a plurality of interfaces with the first region, the interfaces being inclined by $\alpha°$ from a normal of the second major surface, and the first light diffusing layer is closer to the liquid crystal display panel than the second light diffusing layer is, and the plurality of second regions of the first light diffusing layer are arranged in a stripe pattern along a horizontal direction of the liquid crystal display panel.

In one embodiment, the plurality of second regions of the second light diffusing layer are arranged in a stripe pattern along a vertical direction of the liquid crystal display panel.

In one embodiment, each of the second regions of the first and second light diffusing layers is approximated to an isosceles triangle where a base is on the second major surface side, a vertex is on the first major surface side, and a vertex angle is $2\alpha$.

In one embodiment, formulae shown below are met:

$$H \leq \frac{P}{\tan 2\alpha + \tan \alpha}$$

and $$\cos[\alpha(2n-1)] > \frac{N_2}{N_1}$$

where H is a height of the isosceles triangle, and n is an integer not less than 2.

In one embodiment, a difference between a maximum and a minimum of $N_1/N_2$ in a wavelength range from 400 nm to 800 nm is not more than 0.02 of an average of $N_1/N_2$ in the wavelength range.

In one embodiment, the second regions further include a substance which absorbs visible light.

In one embodiment, the predetermined pitch P is not more than three quarters of a pixel pitch in the direction.

In one embodiment, the liquid crystal display device further includes a light scattering layer on a viewer side of the second light diffusing layer.

Effects of the Invention

According to the present invention, the viewing angle characteristics of a direct-viewing type liquid crystal display device can be improved by using a light diffusing layer (light diffusion sheet) which utilizes total reflection. In a liquid crystal display device of the present invention, overlapping images which may be generated due to the light diffusing layer are unlikely to be visually perceived. According to the present invention, the viewing angle characteristics can be improved only by placing the light diffusing layer at a predetermined position on the viewer side of the liquid crystal display panel. The present invention is applicable to any type of known liquid crystal display panels. For example, the present invention is applicable not only to TN mode liquid crystal display panels which have inferior viewing angle characteristics but also to VA mode liquid crystal display panels which have superior viewing angle characteristics. Further, the present invention is also applicable to a liquid crystal display panel which has an alignment-divided structure wherein a pixel includes liquid crystal domains of different alignment directions and/or a pixel-divided (multi pixel) structure wherein a pixel includes regions of different luminances.

Figure 1:
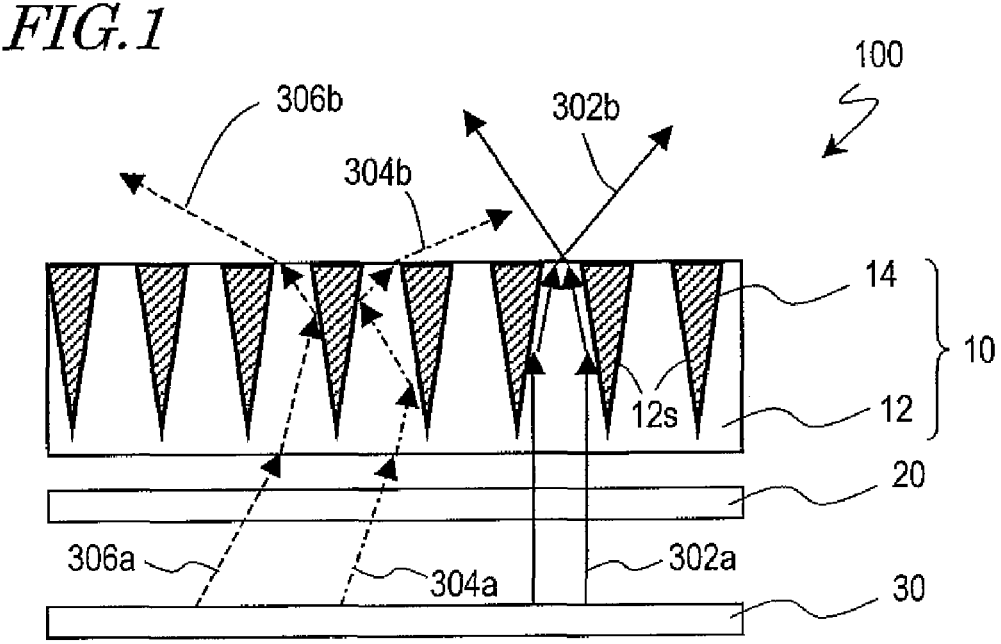
FIG. 1 A schematic exploded cross-sectional view of a liquid crystal display device 100 which includes a light diffusing layer.

DESCRIPTION OF THE REFERENCE NUMERALS 10, 10A, 10B light diffusion sheet, light diffusing layer (total reflection diffusing layer)
12, 12a, 12b high refractive index region (first region)
12s interface (total reflection surface)
14 low refractive index region (second region)
20 MVA mode liquid crystal display panel
20a glass substrate on viewer side
30 backlight unit
40 light scattering layer (diffuse reflection layer)
100, 110, 110A liquid crystal display device
302a perpendicular incident light
302b light outgoing after having been totally reflected only once (perpendicular incident light)
304a, 306a oblique incident light
304b light outgoing after having been totally reflected twice (part of oblique incident light)
306b light outgoing after having been totally reflected only once (part of oblique incident light)

BEST MODE FOR CARRYING OUT THE INVENTION

Hereinafter, a liquid crystal display device which includes a light diffusion sheet according to an embodiment of the present invention is described as to the structure and properties with reference to the drawings. The liquid crystal display device of the present invention may be a direct-viewing type liquid crystal display device wherein light outgoing from a display surface is directly viewed by a viewer.

A light diffusion sheet 10 included in a liquid crystal display device according to an embodiment of the present invention and its function are described with reference to FIG. 1 and FIG. 2. For the sake of simplicity, a liquid crystal display device 100 which includes only one light diffusion sheet is described.

FIG. 1 is a schematic exploded cross-sectional view of the liquid crystal display device 100. FIG. 2 is a schematic exploded perspective view of the liquid crystal display device 100.

The example described herein is a VA mode liquid crystal display device. The VA mode liquid crystal display device which uses a vertical alignment type liquid crystal layer has improved viewing angle characteristics as compared with the conventional TN mode. The vertical alignment type liquid crystal layer includes vertical alignment films by which the pretilt angle of liquid crystal molecules in the absence of an applied voltage is regulated to be not less than 85° and not more than 90°, and a nematic liquid crystal material whose dielectric anisotropy is negative. Among the VA mode liquid crystal display devices, especially, a MVA mode liquid crystal display device described in Patent Document 3 has excellent viewing angle characteristics and therefore has been used in a wide variety of applications. In the MVA mode, alignment control means (slit or rib) which has linear portions extending in two directions perpendicular to each other is provided to form four liquid crystal domains between the alignment control means such that the azimuthal angles of the directors which are representative of the respective domains form angles of 45° relative to the polarization axes (transmission axes) of polarizing plates placed in crossed Nicols. Assuming that the azimuthal angle of 0° is identical with the 3 o'clock direction of the clock dial and that the counterclockwise direction is the positive direction, the azimuthal angles of the directors of the four domains are 45°, 135°, 225°, and 315°. This configuration is most preferable in terms of transmittance because linear polarization in the 45° direction relative to the polarization axes is not absorbed by the polarizing plates. The MVA mode liquid crystal display device has such a configuration in which four domains are formed in one pixel ("4-domain alignment structure" or simply "4D structure") and therefore has improved viewing angle characteristics. However, further improvements in the viewing angle characteristics of the γ characteristic have also been demanded of the MVA mode liquid crystal display device. In the embodiment provided below, an example where the viewing angle characteristics of the γ characteristic of the MVA mode liquid crystal display device are further improved by providing a light diffusing layer is described.

The liquid crystal display device 100 includes the light diffusion sheet 10, a liquid crystal display panel 20, and a backlight unit 30. In an example described herein, the liquid crystal display panel 20 is an MVA mode liquid crystal display panel which includes a phase plate. The entire disclosures of Patent Document 3 are incorporated by reference in this specification. Also, the phase plate used herein may be a known phase plate which is appropriately selected.

The light diffusion sheet 10 includes one light diffusing layer 10 which has a first major surface and a second major surface opposing each other and which is arranged such that the first major surface opposes the viewer side surface of the VA mode liquid crystal display panel. A base film (not shown) may be provided on a side of the light diffusing layer 10 which is closer to the liquid crystal display panel 20 (light incoming side). The viewer side (light outgoing side) of the light diffusing layer 10 may be provided with an antiglare layer, an antireflection layer, a low reflection layer, or a reflection preventing layer (although none of these is shown). As a matter of course, any two or more of these elements may be used in combination when necessary. The light diffusion sheet 10 and the liquid crystal display panel 20 are bonded together via an adhesive layer (not shown). The both outermost surfaces of the liquid crystal display panel 20 are generally provided with polarizing plates, and therefore, the light diffusion sheet 10 is bonded to the polarizing plate on the viewer side. Here, a structure obtained by bonding the light diffusion sheet 10 to the liquid crystal display panel 20 (which does not include the backlight unit 30) is sometimes referred to as a liquid crystal display device.

The light diffusing layer 10 includes the first substance having first refractive index $N_1$ and the second substance having second refractive index $N_2$. Second refractive index $N_2$ is smaller than first refractive index $N_1$. The second substance forms a plurality of second regions (low refractive index regions) 14. The shape of each of the second regions 14 in a cross section perpendicular to the second major surface is approximated to an isosceles triangle where the base is on the second major surface side and the vertex is on the first major surface side. The plurality of second regions 14 are arranged in a first region (high refractive index region) 12 formed of the first substance at predetermined pitch P in at least one direction in a plane parallel to the second major surface. Light which comes from the high refractive index region side and is incident on interfaces 12s between the high refractive index region 12 and the low refractive index regions 14 at an angle not smaller than a critical angle is totally reflected.

Since the isosceles triangle of the low refractive regions of the light diffusing layer 10 described herein meets predetermined conditions as will be described later with reference to FIG. 4, light 302a which is incident perpendicularly onto the major surface of the light diffusing layer 10 (the absolute value of the angle of incidence is not less than 0° and less than 0.1°) undergoes total reflection only once inside the light diffusing layer 10 before outgoing from the light diffusing layer 10 toward the viewer side (outgoing light 302b). Part of light which is incident on the major surface at an oblique angle (the absolute value of the angle of incidence is 0.1° or greater), 304a, undergoes total reflection n or more times (n is an integer not less than 2, n=2 in FIG. 1) inside the light diffusing layer 10 before outgoing from the light diffusing layer toward the viewer side (outgoing light 304b). Another part of the light which is incident on the major surface at an oblique angle (the absolute value of the angle of incidence is 0.1° or greater), 306a, undergoes total reflection only once inside the light diffusing layer 10 before outgoing from the light diffusing layer 10 toward the viewer side (outgoing light 306b). As a result, the viewing angle characteristics in the at least one direction (polar angle (θ) dependence in an azimuthal angle defined by the at least one direction) is improved. In this way, the light diffusing layer 10 diffuses light by utilizing total reflection and is therefore sometimes referred to as "total reflection diffusing layer". Note that the light utilized for display is not limited to totally reflected light.

The light diffusing layer utilizes total reflection and is therefore less affected by the shape as compared with a case where a refraction effect of a lens is utilized. Further, the low refractive index regions have a simple shape which is approximated to an isosceles triangle and are therefore advantageous in terms of easiness of fabrication. Further, the major surfaces (surfaces) of the light diffusing layer which oppose each other are parallel to each other and can be readily bonded onto the surface of the liquid crystal display panel. The surface which is to be bonded onto the liquid crystal display panel is formed only by the high refractive index region. Therefore, the total reflection characteristics inside the light diffusing layer are not affected at all by the bonding.

Figure 2:
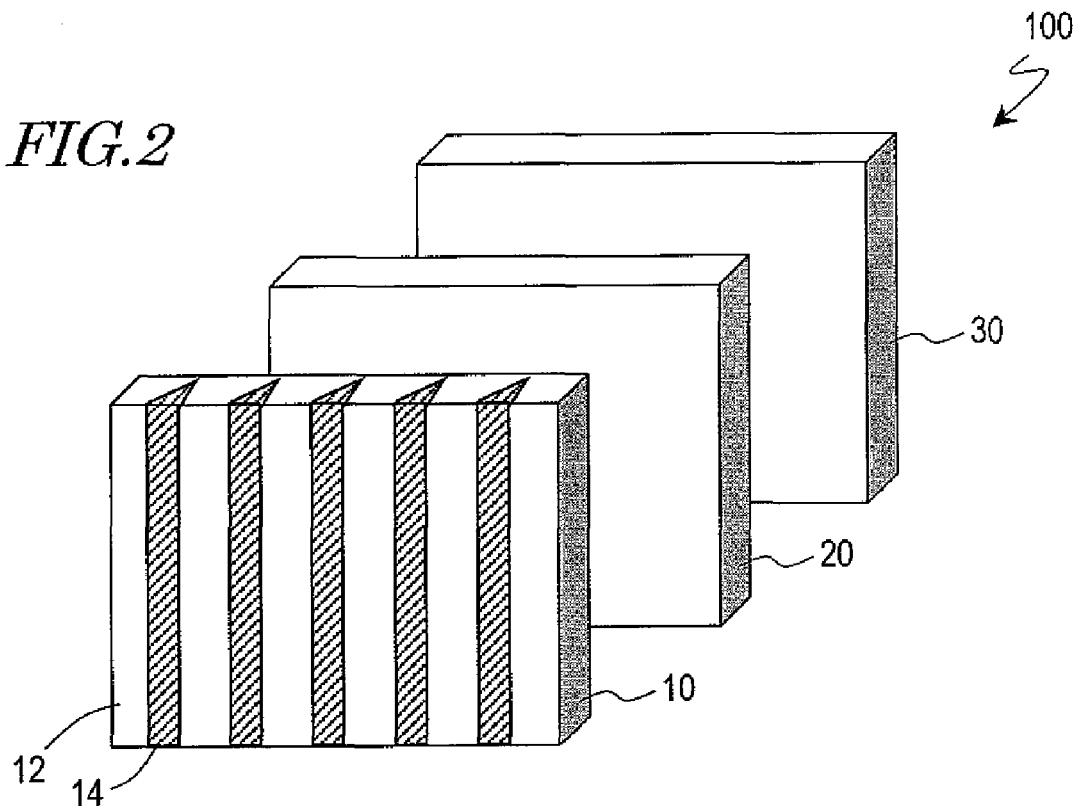
FIG. 2 A schematic exploded perspective view of the liquid crystal display device 100 which includes a light diffusing layer.

Here, as shown in FIG. 2, when viewed in a direction perpendicular to the major surfaces of the light diffusing layer 10, each of the plurality of second regions 14 has the shape of a vertically-extending rectangle. The plurality of second regions 14 are arranged in a stripe pattern along a horizontal direction. FIG. 1 corresponds to a horizontal cross-section of FIG. 2. As seen from FIG. 1, the light diffusing layer 10 is capable of improving the viewing angle characteristics in the horizontal directions (i.e., the polar angle (θ) dependence in the horizontal directions). In many of the MVA type liquid crystal display panels 20 although it depends on the purpose of use, when describing with an imaginary clock dial superposed on the display surface, the azimuthal angles of the directors of the four domains are set to 45°, 135°, 225°, and 315°, and the polarization axis (transmission axis) of one of a pair of polarizing plates in a crossed Nicols arrangement is generally parallel to the vertical directions (12 o'clock and 6 o'clock directions) of the display surface, the polarization axis of the other being generally parallel to the horizontal directions (3 o'clock and 9 o'clock directions). In the liquid crystal display devices, the required viewing angle characteristics vary depending on the purpose of use. Therefore, by providing the light diffusing layer 10 that includes the plurality of rectangular second regions 14 that extend perpendicular to a direction in which a wide viewing angle characteristic is required and that are arranged along the direction in which a wide viewing angle characteristic is required, the viewing angle characteristics can be effectively improved. In general, the viewing angle characteristics in the horizontal directions are of greater importance. Using a light diffusing layer shown in FIG. 2 which includes a plurality of vertically-extending rectangular second regions 14 that are arranged along a horizontal direction is effective.

Figure 3:
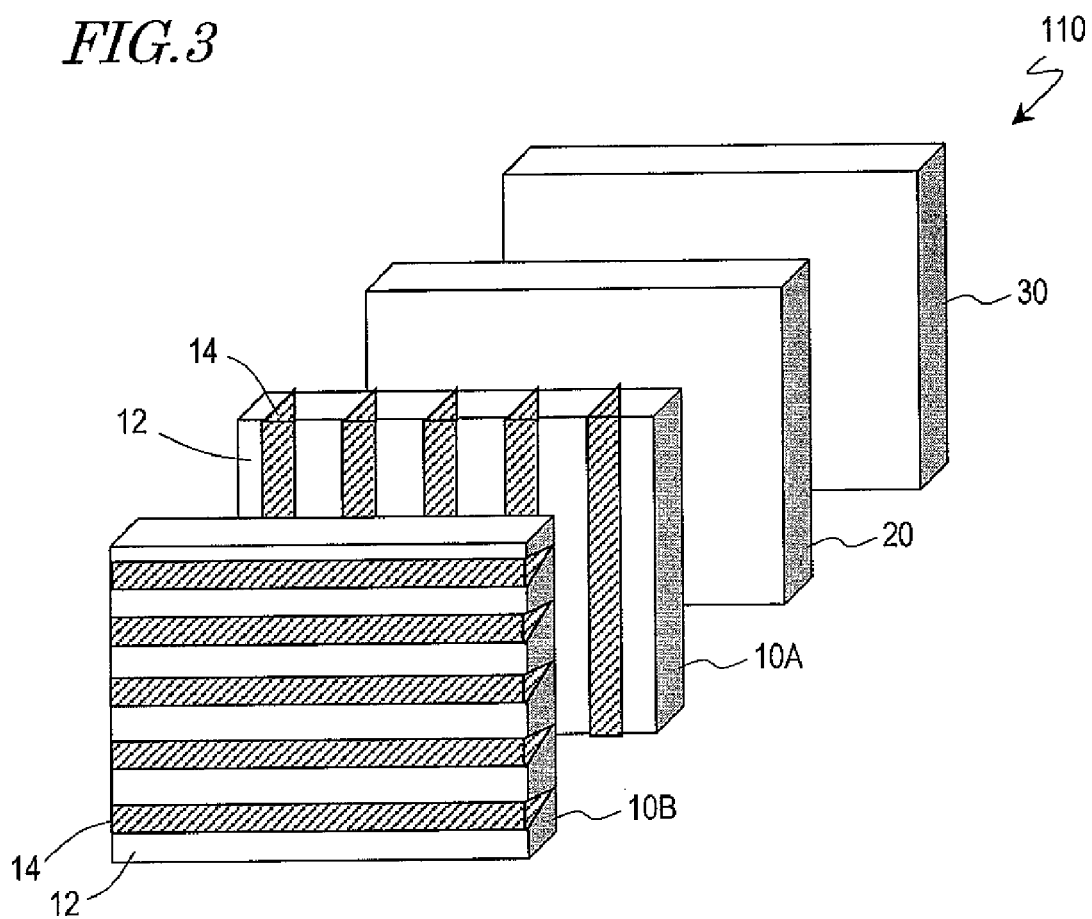
FIG. 3 A schematic exploded perspective view of a liquid crystal display device 110 of an embodiment of the present invention.

A liquid crystal display device 110 of an embodiment of the present invention includes light diffusing layers 10A and 10B as shown in the schematic exploded perspective view of FIG. 3. Here, the light diffusing layer 10A is the same as the light diffusing layer 10 of the liquid crystal display device 100. The light diffusing layer 10B includes a plurality of horizontally-extending rectangular second regions 14 which are arranged in a stripe pattern along a vertical direction. By additionally providing the light diffusing layer 10B in this way, the viewing angle characteristics in the vertical directions can be improved.

Next, the structure and functions of the light diffusing layer 10 are described in detail with reference to FIG. 4. In the following description, for the sake of simplicity, the major surfaces of the liquid crystal display panel 20 and the major surfaces of the light diffusing layer 10 are parallel. Refraction of light which would occur at the interface between these elements and at the interfaces with an adhesive layer (not shown) for bonding these elements is ignored. Note that the description below generally holds true even when such refraction is considered.

Figure 4:
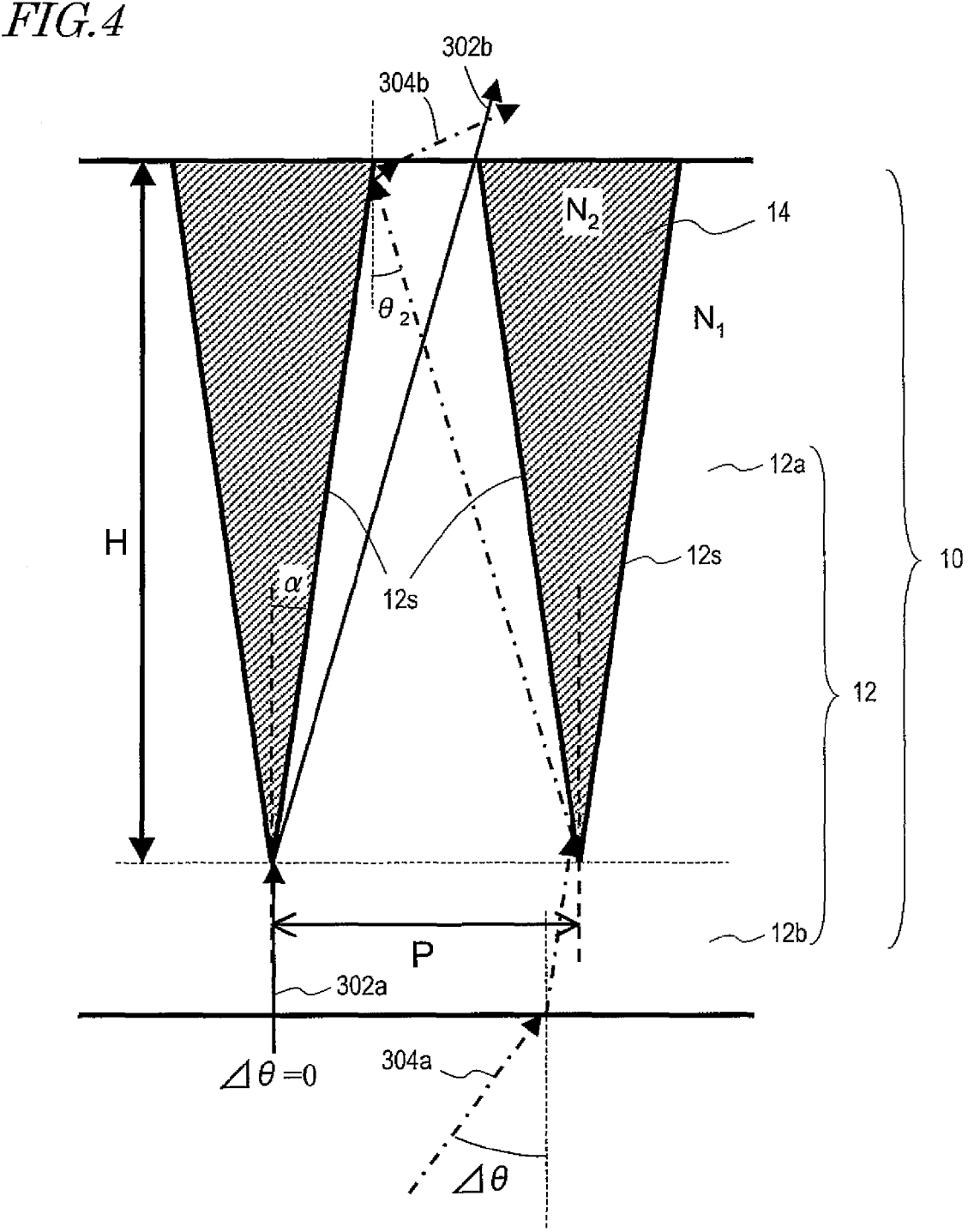
FIG. 4 A diagram for illustrating the structure and functions of a light diffusing layer 10.

Here, as shown in FIG. 4, the pitch of the low refractive index regions 14 is denoted by P, the height of the isosceles triangle is denoted by H, and the vertex angle of the isosceles triangle is denoted by 2α. Light 302a which is incident perpendicularly onto the light diffusing layer 10 (Δθ=0 in FIG. 4) undergoes total reflection only once. Therefore, when considering the most strict design conditions, the condition that light totally reflected at the vertex of a low refractive index region 14 outgo from the surface of the light diffusing layer 10 without entering a neighboring low refractive index region 14 (outgoing light 302b) is necessary. Thus, the following formula holds:

$$H \leq \frac{P}{\tan 2\alpha + \tan \alpha} \quad (1)$$

Also, the condition that light incident on the light diffusing layer 10 in an oblique direction (|Δθ|>0°) undergo total reflection once, which is shown below, need to be met (see the incident light 306a and the outgoing light 306b in FIG. 1):

$$N_1 \cos\left\{\sin^{-1}\left(\frac{\sin\Delta\theta}{N_1}\right) + \alpha\right\} > N_2 \quad (2)$$

In order that part of the light incident on the light diffusing layer 10 in an oblique direction (|Δθ|>0°), 304a, may undergo total reflection twice before outgoing from the light diffusing layer 10 (outgoing light 304b), θ₂ need to meet the condition that total reflection occur at the interfaces 12s.

θ₂ is given as follows:

$$\theta_2 = \sin^{-1}\left(\frac{\sin\Delta\theta}{N_1}\right) + 2\alpha \quad (3)$$

Therefore, due to the Snell's law, the total reflection condition at the interfaces 12s between the high refractive index region (first region: N₁) 12 and the low refractive index regions (second regions: N₂) 14 is as follows:

$$N_1 \sin(90°-\theta_2-\alpha) = N_1 \cos(\theta_2+\alpha) > N_2 \quad (4)$$

This formula is transformed by replacing θ₂ as follows:

$$N_1 \cos\left(\sin^{-1}\left(\frac{\sin\Delta\theta}{N_1}\right) + 3\alpha\right) > N_2 \quad (5)$$

Actually, in formula (5), the light which undergoes total reflection twice is not collimated light (Δθ=0° does not hold) but light that is incident at an angle in a region of Δθ which is extremely close to collimated light. Therefore, the following relationship can be deduced:

$$\lim_{\Delta\theta \to 0} N_1 \cos\left(\sin^{-1}\left(\frac{\sin\Delta\theta}{N_1}\right) + 3\alpha\right) = N_1 \cos(3\alpha) > N_2 \quad (6)$$

$$\therefore \cos(3\alpha) > \frac{N_2}{N_1}$$

As such, to design the light diffusing layer (total reflection diffusing layer) 10 such that light perpendicularly coming in the liquid crystal display panel (Δθ=0) undergoes total reflection only once and part of the light coming in the liquid crystal display panel in an oblique direction (|Δθ|>0) undergoes total reflection twice under the circumstance where the backlight unit used has the half-value angle Δθ₅₀ in the case of a certain directivity, the light diffusing layer may be designed so as to meet above formulae (1) and (6). By doing so, not only the once-totally-reflected light of the oblique light but also the twice-totally-reflected light can efficiently be utilized, so that wide viewing angle characteristics are achieved.

In a case where part of the oblique incident light is allowed to undergo total reflection n or more times (n≧2), above formula (6) can be expanded to the following formula:

$$\cos[\alpha(2n-1)] > \frac{N_2}{N_1} \quad (n \text{ is an integer not less than 2}) \tag{7}$$

Therefore, in a case where part of the oblique incident light is allowed to undergo total reflection n or more times, the light diffusing layer is designed so as to meet formulae (1) and (7).

Also, as a matter of course, it is necessary to meet the condition that light should not finally undergo total reflection but be refracted at the interface between the high refractive index region 12 (refractive index $N_1$) and the air so as to outgo from the high refractive index region 12. Therefore, as for light which undergoes total reflection n times at the interfaces 12s between the high refractive index region 12 and the low refractive index regions 14, it is necessary to meet the following formula:

$$N_1 \sin\left\{\sin^{-1}\left(\frac{\sin\Delta\theta}{N_1}\right) + 2n\alpha\right\} < 1 \tag{8}$$

(total reflection n times, n is an integer not less than 1)

Under the circumstance where formula (1) and formula (6) or formula (1) and formula (7) are met, the maximum intensity in the intensity distribution of light emitted from the backlight unit 30 is assumed to be 100%, and the angles at which the intensity is 10% are denoted by $\pm\Delta\theta_{10}$. Designing the light diffusing layer such that $\pm\Delta\theta_{10}$ meets formula (1) and formula (6) or formula (1) and formula (7) is preferable because light transmitted through and outgoing from the liquid crystal display panel 20 can be utilized efficiently (90% or more) in the light diffusing layer 10. In this case, the means for condensing the light emitted from the backlight unit 30 may be selected from a wide variety of known optical elements. For example, a prism sheet, an integral structure of a prism sheet and a diffuse reflection plate (light scattering plate), a lover, or a reversed prism may be used. Note that, in the present specification, when such an element is added, a unit including the added element is referred to as "backlight unit".

Note that the directivity of the light emitted from the backlight unit does not necessarily need to be set such that the above-described conditions are met. The viewing angle characteristics are not affected so long as light incident at an angle which does not meet the above-described conditions is absorbed by the low refractive index regions 14 as will be described later.

Figure 5:
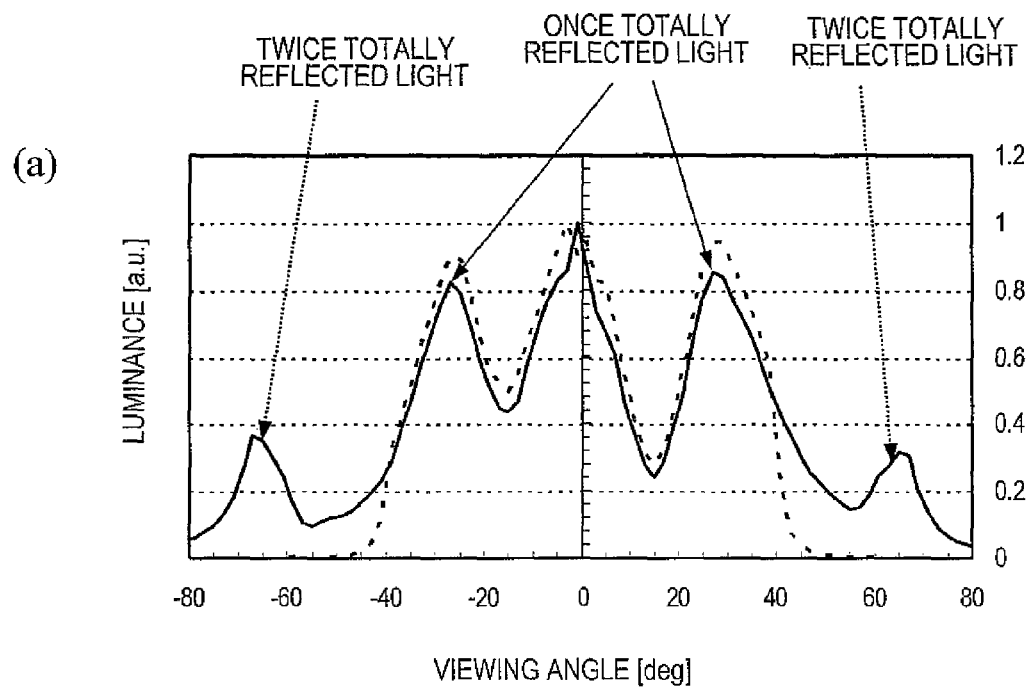
FIGS. 5(a) and (b) are graphs showing the diffusion characteristics of light outgoing from different light diffusing layers. (a) corresponds to a case where the half-value angle $\Delta\theta_{50}$ of light emitted from the backlight unit is $\pm 10°$. (b) corresponds to a case where the half-value angle $\Delta\theta_{50}$ of light emitted from the backlight unit is $\pm 35°$.
Figure 5:
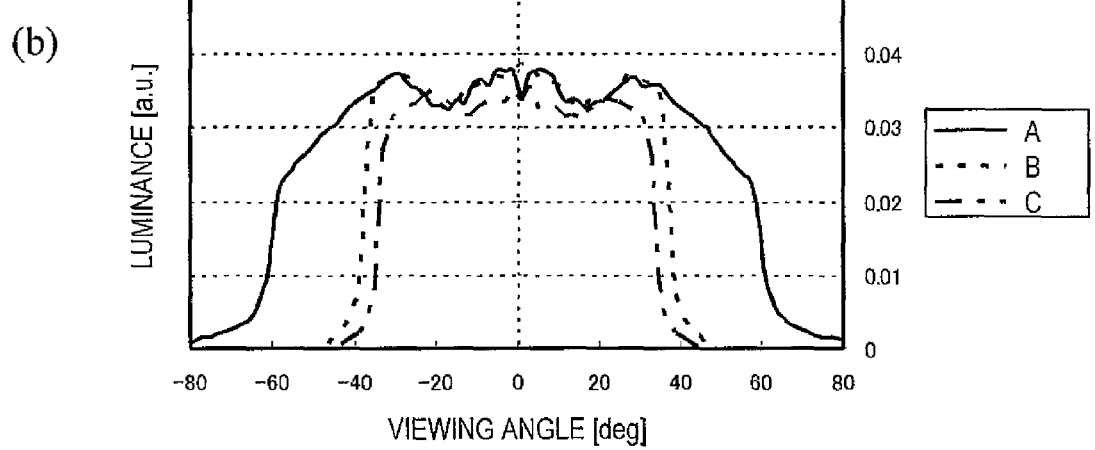

Next, the difference in light diffusion characteristic among the cases where light diffusing layers characterized by the following three parameter sets A, B, and C (respectively referred to as "light diffusing layers A, B, and C") are used is described with reference to FIG. 5. The light diffusing layer A meets the above-described conditions whereas the light diffusing layers B and C do not meet the above-described conditions.

A: $N_1$=1.55, $N_2$=1.40, $\alpha$=8.0°, P=50 μm, H=110 μm

B: $N_1$=1.55, $N_2$=1.50, $\alpha$=8.0°, P=50 μm, H=110 μm

C: $N_1$=1.55, $N_2$=1.50, $\alpha$=6.0°, P=50 μm, H=155 μm

FIG. 5(a) shows the diffusion characteristic of light outgoing from the light diffusing layer 10 under the circumstance where light having the directivity of half-value angle $\Delta\theta_{50}$=±10° comes from the backlight unit and enters the light diffusing layers A and B. The diffusion characteristic shown herein is the polar angle dependence of the outgoing light intensity in a direction in which the low refractive index regions 14 are arranged at a predetermined pitch, and corresponds to the viewing angle characteristics of the liquid crystal display device. It is seen that the light diffusing layer A can efficiently utilize the light which has undergone total reflection twice inside the light diffusing layer and, as a result, the intensity distribution of the outgoing light extends over a wide angle range as compared with the light diffusing layer B.

However, the intensity distribution of the outgoing light of the light diffusing layer A of FIG. 5(a) shows prominent peaks of the once-totally-reflected light and prominent peaks of the twice-totally-reflected light. These peaks may cause the viewer to feel a sense of discontinuity in the viewing angle characteristics. Thus, to prevent this, decreasing the directivity of light which comes in the light diffusing layer, i.e., increasing the half-value angle $\Delta\theta_{50}$, is preferable. FIG. 5(b) shows a result of the diffusion characteristics under the circumstance where the half-value angle $\Delta\theta_{50}$ of the light emitted from the backlight unit is ±35°.

As seen from FIG. 5(b), the intensity distribution of the outgoing light of the light diffusing layer A which meets the above-described conditions is wider than those of the light diffusing layers B and C, and does not have a prominent peak such as those seen in FIG. 5(a). Thus, it is possible to prevent the viewer from feeling a sense of discontinuity in the viewing angle characteristics.

Figure 6:
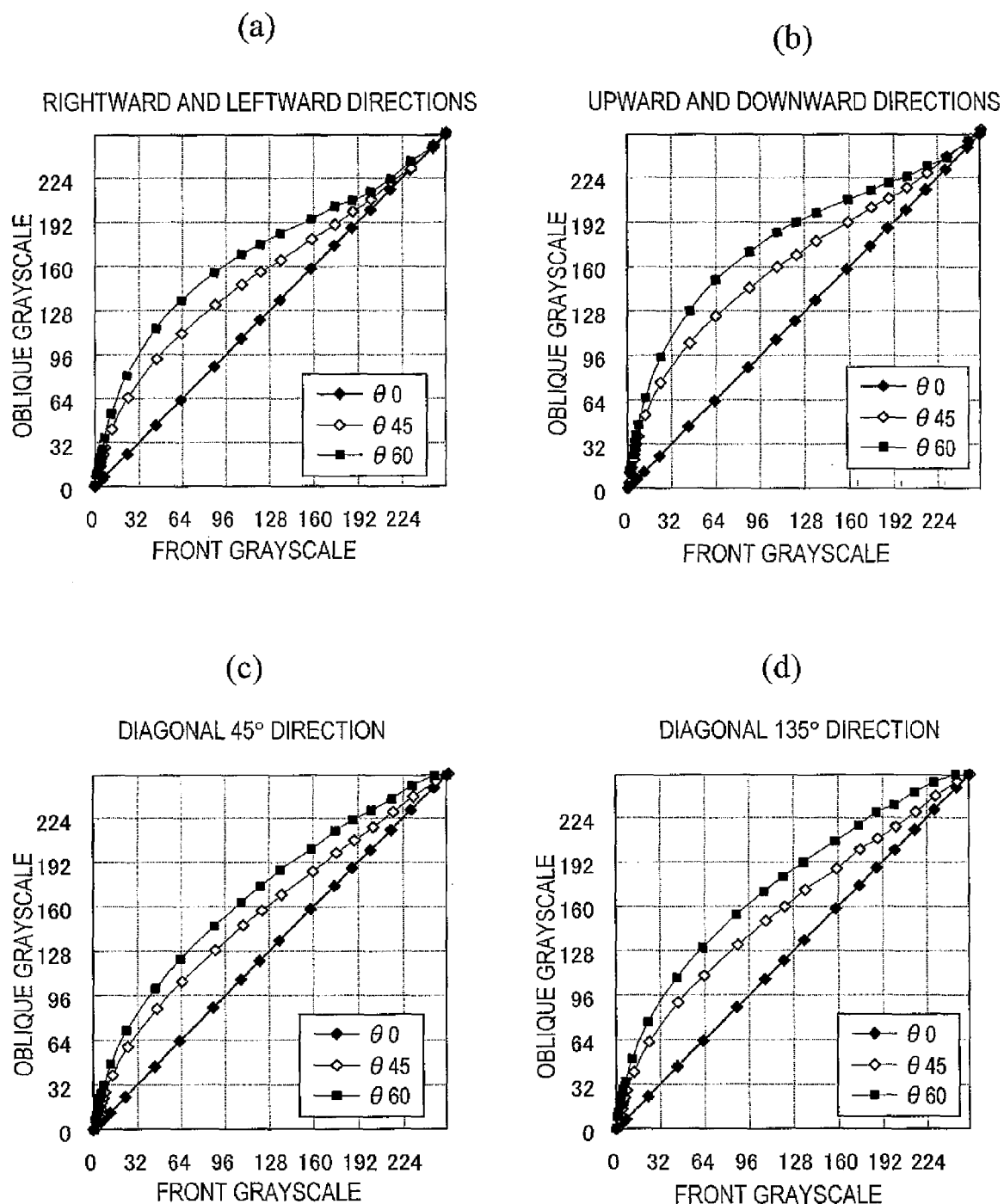
FIG. 6(a) to (d) are graphs showing the viewing angle dependence of the γ characteristic of a conventional MVA mode liquid crystal display device.
Figure 7:
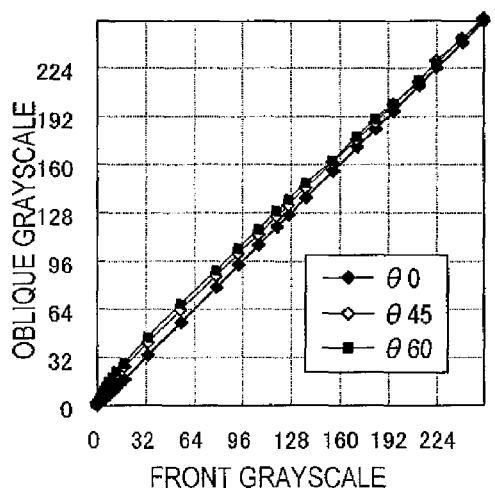
FIG. 7(a) to (d) are graphs showing the viewing angle dependence of the γ characteristic of an MVA mode liquid crystal display device which includes one light diffusing layer.
Figure 7:
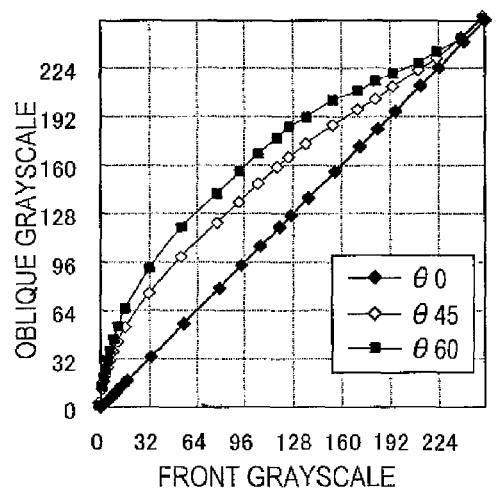
Figure 7:
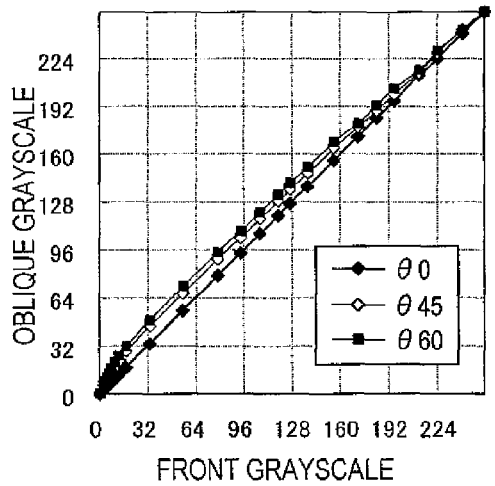
Figure 7:
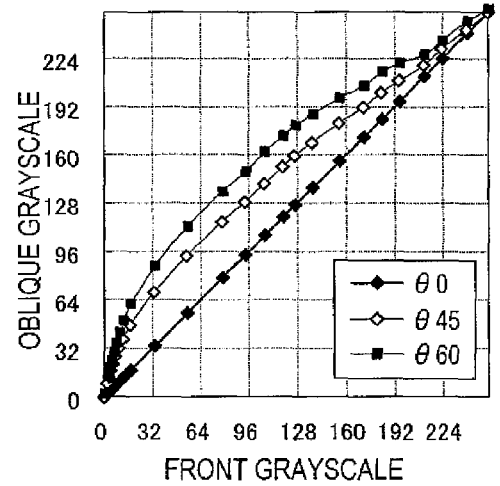
Figure 8:
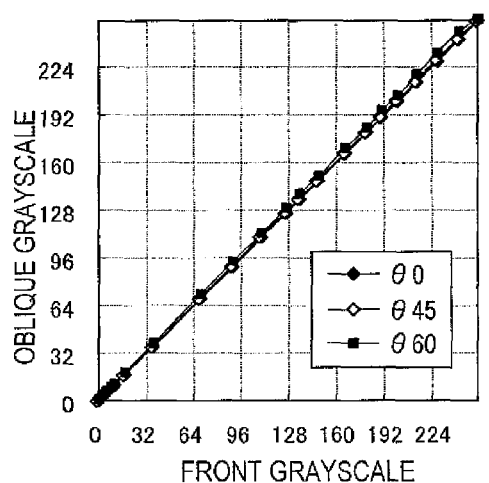
FIG. 8(a) to (d) are graphs showing the viewing angle dependence of the γ characteristic of a MVA mode liquid crystal display device of an embodiment of the present invention.
Figure 8:
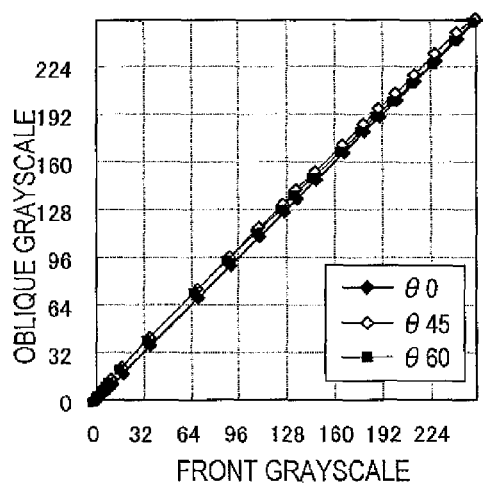
Figure 8:
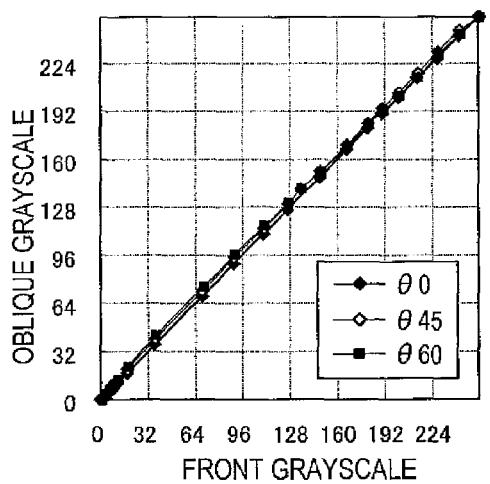
Figure 8:
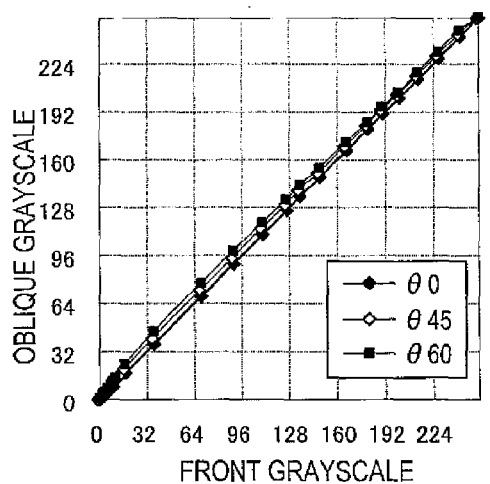

Next, the viewing angle dependence (polar angle dependence) of the γ characteristic of a conventional MVA mode liquid crystal display device and a MVA mode liquid crystal display device of an embodiment of the present invention is described with reference to FIG. 6, FIG. 7, and FIG. 8. In the graphs of FIG. 6 to FIG. 8, the abscissa axis represents the grayscale levels which are intended to be displayed (input grayscale levels, from level 0 to level 255). The ordinate axis represents the grayscale levels which are actually displayed. Any of these liquid crystal display devices is configured such that the curve of γ=2.2 is obtained when viewed from a position in front of the display device.

FIGS. 6(a) to 6(d) are graphs showing the viewing angle dependence of the γ characteristic of the conventional MVA mode liquid crystal display device. This conventional liquid crystal display device includes a phase plate. FIGS. 7(a) to 7(d) are graphs showing the viewing angle dependence of the γ characteristic of an MVA mode liquid crystal display device, which includes only one light diffusing layer 10 that meets the above-described conditions in addition to the components of the conventional MVA type liquid crystal display device that has the viewing angle characteristics of FIGS. 6(a) to 6(d). This liquid crystal display device has the same structure as that of the liquid crystal display device 100 shown in FIG. 2. FIGS. 8(a) to 8(d) are graphs showing the viewing angle dependence of the γ characteristic of a MVA mode liquid crystal display device of an embodiment of the present invention, which includes two light diffusing layers 10 that meet the above-described conditions in addition to the components of the conventional MVA type liquid crystal display device that has the viewing angle characteristics of FIGS. 6(a) to 6(d). This liquid crystal display device has the same structure as that of the liquid crystal display device 110 shown in FIG. 3. In each of FIG. 6, FIG. 7, and FIG. 8, (a) shows the polar angle θ dependence in the rightward and leftward directions, (b) in the upward and downward directions, (c) in the 45° direction, and (d) in the 135° direction. As for the azimuthal angle, 3 o'clock direction corresponds to 0°, and the counterclockwise direction is the positive direction.

As seen from FIG. 6(a), in the conventional liquid crystal display device, whitening (a phenomenon that the state of display is at a higher luminance than that originally intended) becomes more conspicuous as the polar angle θ increases in any of the azimuthal angle directions. This tendency is most noticeable in the upward and downward (vertical) directions and second most noticeable in the rightward and leftward (horizontal) directions. Although not shown, when the retardation of the liquid crystal layer is large, grayscale inversion (a phenomenon that the luminance decreases as the grayscale level increases) occurs in a range near the highest grayscale level.

On the other hand, referring to FIGS. 7(a) to 7(d), it is seen that, in the liquid crystal display device shown in FIG. 2, the viewing angle characteristics in the rightward and leftward directions are significantly improved. Specifically, in the light diffusing layer 10 included in this liquid crystal display device (see FIG. 2), the low refractive index regions 14 are extending in the vertical direction, and the viewing angle characteristics in the horizontal (rightward and leftward) directions that are perpendicular to the direction in which the low refractive index regions 14 are extending are significantly improved. In the example described herein, the above parameters of the light diffusing layer are $N_1=1.59$, $N_2=1.40$, $\alpha=8.0°$, P=50 μm, and H=110 μm. Specifically, by providing the light diffusing layer in which the vertically-extending low refractive index regions 14 are arranged in the horizontal direction, the whitening in the rightward and leftward directions is greatly ameliorated, and the grayscale characteristics in diagonal directions (polar angle>0°) also reach a value which is close to γ=2.2. Note that the light diffusing layer includes a plurality of low refractive regions which are extending in the vertical direction and which are arranged in the horizontal direction such that the direction of arrangement is inclined by ±1° or more relative to the bus line. The direction of the inclination may be clockwise or may be counterclockwise. In the example described herein, the inclination is counterclockwise. This inclination produces the effect of preventing moiré which will be described later and also produces the effect of improving the viewing angle characteristic in the 45° direction as shown in FIG. 7(c).

Referring to FIGS. 8(a) to 8(d), it is seen that, in the liquid crystal display device of the embodiment of the present invention which includes two light diffusing layers such that the low refractive index regions 14 are arranged in stripe patterns in the horizontal direction and the vertical direction (see FIG. 3), the viewing angle characteristics in the upward and downward directions and the horizontal directions are improved, and the viewing angle characteristics in the 45° direction and the 135° direction are also improved. It is also seen that the viewing angle characteristics in all the azimuths reach values which are close to γ=2.2.

Note that the half-value angle $\Delta\theta_{50}$ of the light emitted from the backlight unit used herein is about ±35°, and this light includes rays which deteriorate the viewing angle characteristics. Therefore, by limiting the half-value angle $\Delta\theta_{50}$ to ±25° or less, more preferably by limiting $\Delta\theta_{50}$ to ±15° or less, the grayscale characteristic in an oblique viewing angle (|θ|>0°) can reach a value which is closer to γ=2.2. Note that, as will be described later, when employing a structure where light incident on the light diffusing layer 10 at a large angle of incidence is absorbed by the low refractive index regions 14, the directivity of light emitted from the backlight unit does not necessarily need to be increased, i.e., the half-value angle does not necessarily need to be decreased.

Figure 9:
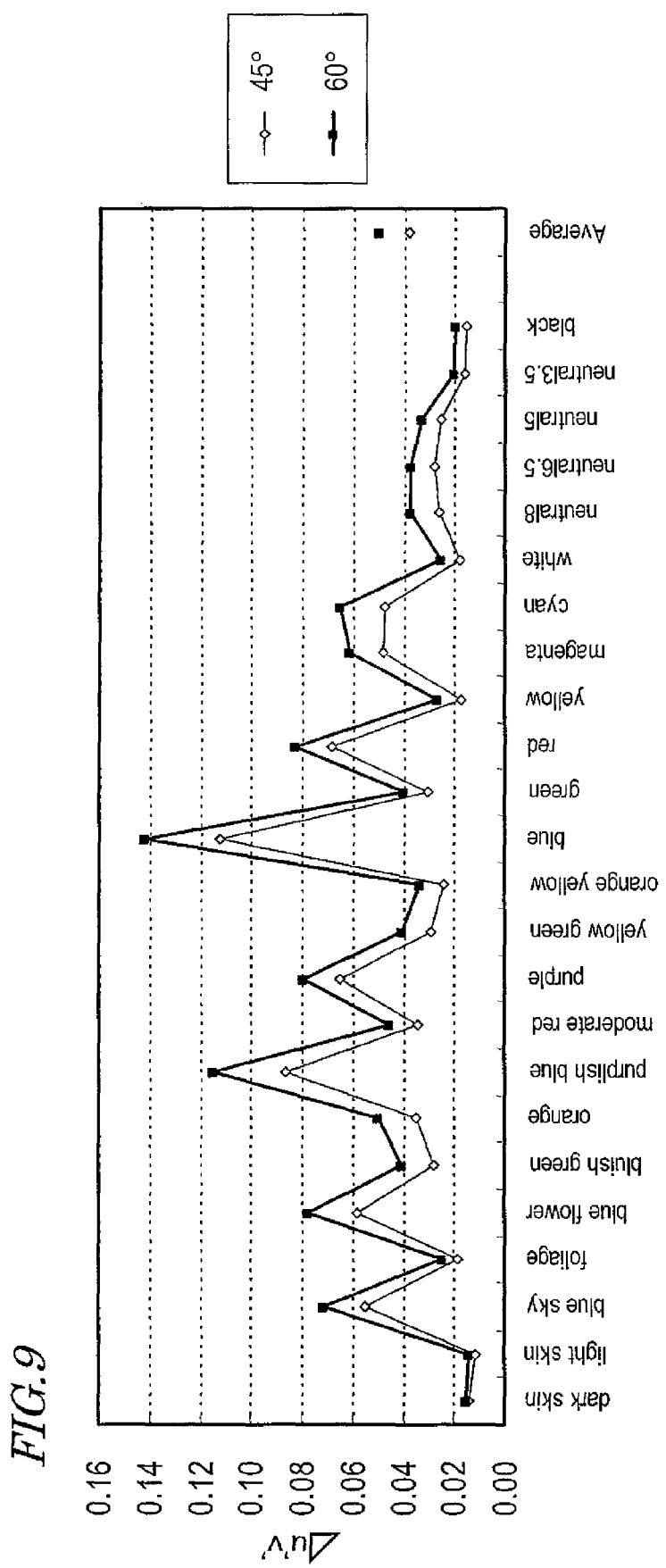
FIG. 9 A graph showing the color difference in a conventional liquid crystal display device.
Figure 10:
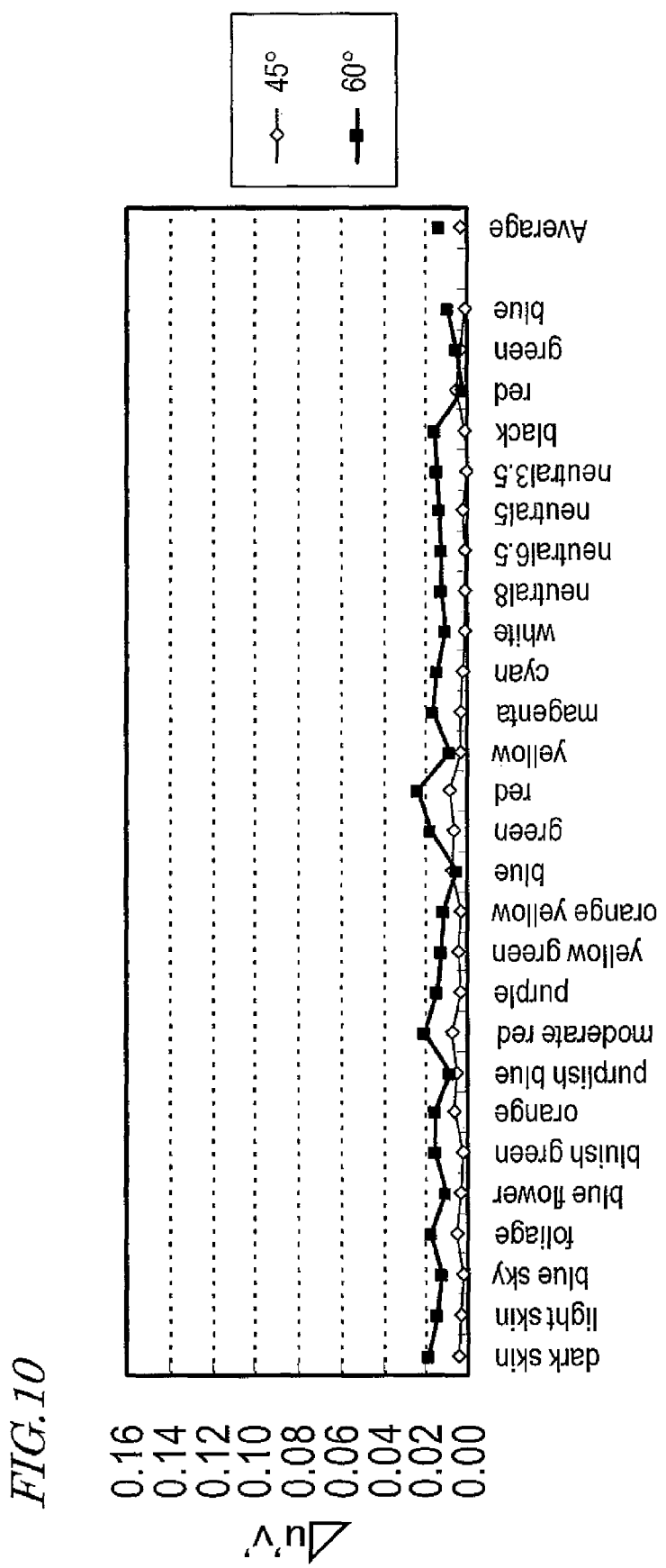
FIG. 10 A graph showing the color difference in a liquid crystal display device of an embodiment of the present invention.

Next, the chromaticity change characteristic is described with reference to FIG. 9 and FIG. 10. FIG. 9 shows the color difference in a conventional liquid crystal display device. FIG. 10 shows the color difference in a liquid crystal display device of an embodiment of the present invention. In FIG. 10, measures are taken to prevent a local chromaticity change (a blue shift in chromaticity at a certain polar angle) in the polar angle dependence of the viewing angle characteristics which will be described later. The conventional liquid crystal display device has the viewing angle dependence of the γ characteristic which is shown in FIG. 6. The liquid crystal display device of this embodiment has the viewing angle dependence of the γ characteristic which is shown in FIG. 8. FIG. 9 and FIG. 10 represent the chromaticity obtained when the display devices are viewed in the horizontal directions, showing the results obtained when the polar angle θ is 45° and 60°. FIG. 9 and FIG. 10 show the change in chromaticity (difference from the chromaticity at θ=0°) in the Macbeth chart which occurs depending on the viewing angle. The colors up to the 18th (cyan) from the left are chromatic colors, and the colors from the 19th (white) to the 24th (black) are achromatic colors, with the average values shown at the rightmost end.

As shown in FIG. 9, in the conventional liquid crystal display device, as for the chromaticity change in the respective colors at the polar angle θ=45°, some colors have large color differences Δu'v' in the u'v' chromaticity coordinates. On the other hand, as shown in FIG. 10, in the liquid crystal display device of the embodiment of the present invention, the color differences Δu'v' are small values which are not more than 0.01.

In the above-described light diffusing layer, the shape of a cross-section of the low refractive index region which is perpendicular to the major surface in a certain direction is approximated to an isosceles triangle and has the predetermined relationship which has been described with reference to FIG. 4. Therefore, the above-described light diffusing layer has such advantages that the light utilization efficiency is high and that the viewing angle characteristics are greatly improved. However, the light diffusing layer of the liquid crystal display device of the embodiment of the present invention is not limited to this example. Specifically, not only the light diffusing layer A but also light diffusing layers B and C may be used.

The light diffusing layer 10 may include a first region formed of the first substance that has first refractive index $N_1$ and a plurality of second regions formed of the second substance that has second refractive index $N_2$ such that the plurality of second regions are arranged in the first region at predetermined pitch P in one direction in a plane parallel to the second major surface, and that the plurality of second regions respectively have a plurality of interfaces with the first region, the interfaces being inclined by α° from the normal of the second major surface. As the light diffusing layer 10, the light diffusing layer (light diffusion sheet) described in Patent Document 2 may be used. Note that the light diffusing layer described in Patent Document 2 has a configuration that allows only near-collimated rays, which have the angle of incidence in the range of not less than 0° and not more than 10°, to efficiently undergo total reflection only once. Thus, the light utilization efficiency is low, and the improvement in viewing angle characteristics is small.

As described above, only by providing a light diffusing layer that utilizes total reflection on the viewer side of the liquid crystal display panel, the viewing angle characteristics of the γ characteristic of a VA mode liquid crystal display device can be improved. However, as described above, the present inventor found a problem that, when a light diffusing layer which utilizes total reflection is provided on the viewer side of a direct-viewing type liquid crystal display panel, an overlapping image is visually perceived. This problem is specific to a case where the light diffusing layer is applied to the direct-viewing type.

Next, overlapping images which can be visually perceived when a light diffusing layer of an embodiment of the present invention is used are described with reference to FIGS. 11(a) and 11(b).

Figure 11:
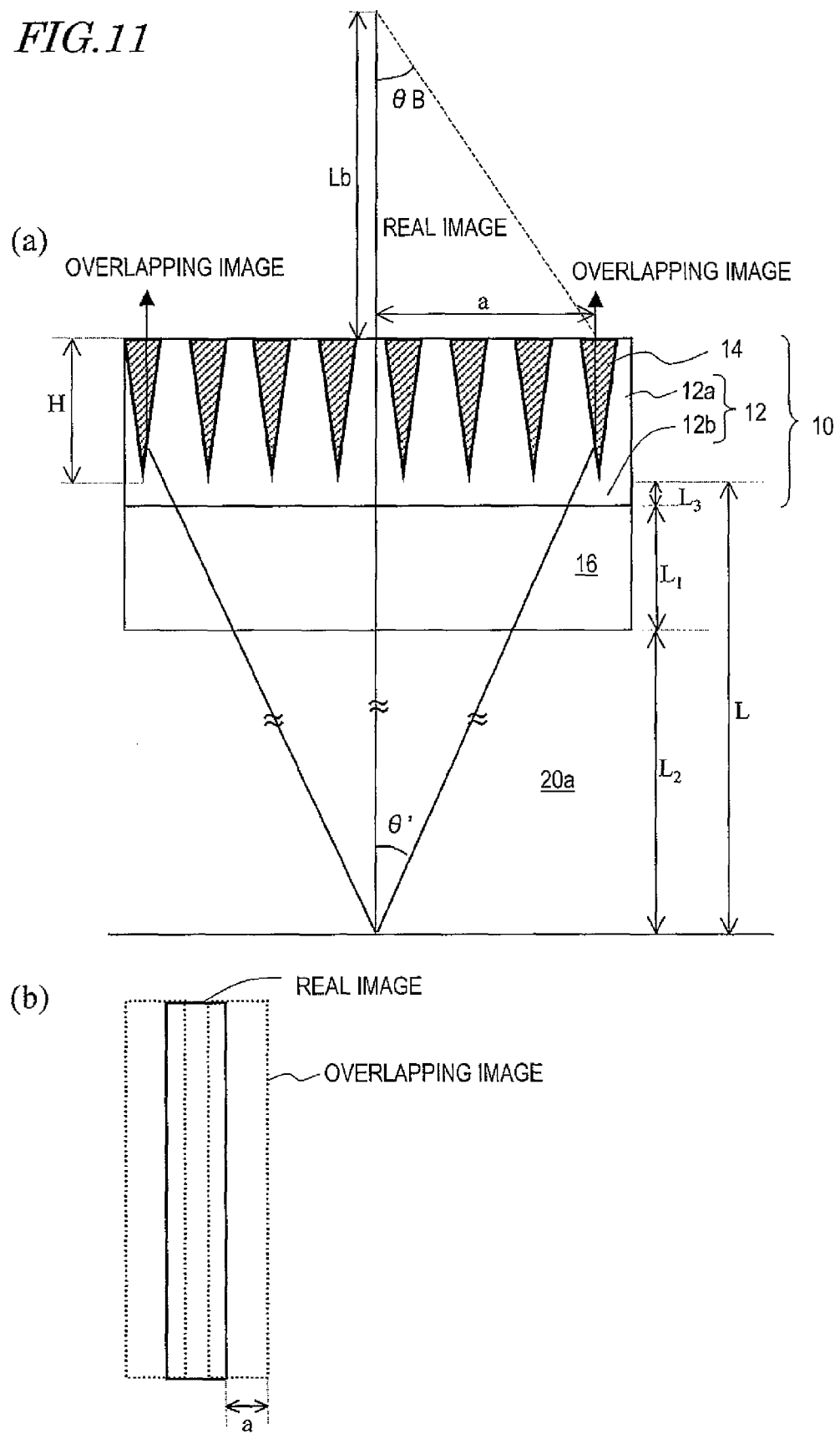
FIGS. 11(a) and (b) are diagrams for illustrating overlapping images which can be visually perceived when a light diffusing layer of an embodiment of the present invention is used. (a) is a schematic cross-sectional view. (b) is a schematic plan view.

As schematically shown in FIG. 11(a), the light emitted from the backlight unit includes rays which meet $|\theta'|>0°$ and which are emitted at angles that do not meet the above-described conditions. Therefore, a real image (primary image) produced by light of $\theta'=0°$ and overlapping images (secondary images) produced by light incident at angles of $|\theta'|>0°$ may be visually perceived. This is because the light incident on the light diffusing layer 10 at an angle of $|\theta'|>0°$ outgoes frontward at a position distant by distance a (μm) from a position where the light incident at $\theta'=0°$ outgoes from the high refractive index region 12a of the light diffusing layer 10. The light incident on the light diffusing layer 10 at an angle of $|\theta'|>0°$ travels from the high refractive index region 12a into the low refractive index region 14 and is refracted there so as to outgo frontward. When a line for one pixel of the liquid crystal display device is lighted, a viewer viewing the liquid crystal display device in a direction perpendicular to the display surface would visually perceive a real image and overlapping images as shown in FIG. 11(b).

In FIG. 11(a), $L_1$ denotes the thickness of the base film 16, $L_2$ denotes the sum of the thickness of a glass substrate 20a and the thickness of the polarizing plate, and $L_3$ denotes the distance from the bottom surface of the high refractive index substance (first substance) to the vertex of the low refractive index substance (second substance) of the light diffusing layer 10.

θ' shown herein is an angle which represents the traveling direction of light inside the glass substrate 20a and the polarizing plate (not shown because it is thin) provided on the viewer side of the liquid crystal display panel 20. The light is refracted when entering a base film 16 and is again refracted when entering the high refractive index region 12 so as to travel with an angle smaller than θ', although the difference in refractive index between these elements is small. Since the decrease in the angle of incidence due to the refraction is not considered, the conditions obtained herein are to be stricter than the actual conditions.

The above-described overlapping images result from the fact that part of the light traveling from the high refractive index region 12 into the low refractive index regions 14 (the light incident at a smaller angle than the critical angle) is not totally reflected by the interfaces 12s but is refracted to enter the low refractive index regions 14, and the refracted light outgoes in a direction perpendicular to the display surface.

In a direct-viewing type liquid crystal display device, light emitted from the backlight unit is diffused light. Therefore, the light includes components which meet the following relationship (collimated light components):

$N_1 \cos \alpha > N_2$

On the other hand, some components of the oblique incident light (Δθ>0) do not meet the following relationship:

$N_1 \cos(\theta'+(2n-1)\alpha) > N_2$ (n is an integer not less than 1).

Specifically, some components of the oblique incident light are not totally reflected at the interfaces 12s but are refracted to enter the low refractive index regions 14.

This refraction can occur so long as there is an interface (between the high refractive index region and the low refractive index region) which is inclined relative to the major surface. The problem can occur not only when a light diffusing layer which meets the predetermined relationship described with reference to FIG. 4 is used, but also when the light diffusing layer described in Patent Document 2 is used.

A liquid crystal display device of the present invention provides a solution to this problem. Hereinafter, structures and functions are described which are capable of preventing visual perception of overlapping images that would occur in a direct-viewing type liquid crystal display device which includes a light diffusing layer that utilizes total reflection.

A possible countermeasure is to make overlapping images unperceivable by a human eye although occurrence of the overlapping images may be allowed. The visual acuity is measured as the resolution, i.e., the capability of distinguishing two adjacent dots as being separate from each other, with the use of the Landolt ring. The visual acuity is expressed as the inverse of the smallest detectable visual angle. A capability of distinguishing the visual angle of 1 arc minute (=one sixtieth (1/60) of one degree) is defined as "visual acuity 1.0". If the smallest detectable visual angle is 2 arc minutes, the visual acuity is 0.5. The standard distance for visual acuity measurement is 5 meters from the eye chart. In a Landolt ring corresponding to visual acuity 1.0, dots or lines which can be distinguished as being separate from each other are separated by a distance of 1.5 mm. Note that 1.5 mm corresponds to the visual angle of 1 arc minute when viewed from a position 5 meters away from the eye chart.

For example, a viewer who has the visual acuity of 1.0 based on the Landolt ring (=1.0 arc minute in visual angle), 50 cm away from the liquid crystal display panel, can distinguish the distance of 150 μm (precisely, 145 μm). Thus, when a is 150 μm or less, visual perception of overlapping images can be efficiently prevented. Therefore, assuming that the sum of L and H is the total distance, the condition of tan θ'*(L+H) <150 μm may be met. The present inventor performed a subjective evaluation and obtained a result that, for a viewer at a position 50 cm away from the liquid crystal display panel, the acceptable value of distance a was 250 μm or less. This corresponds to a visual angle of 1.7 arc minutes or less.

Here, the description is provided with a liquid crystal display device example which employs the configuration shown in FIG. 3 so that the viewing angle characteristics in the rightward and leftward (horizontal) directions are improved. Specifically, the first light diffusing layer 10A is closer to the liquid crystal display panel 20 than the second light diffusing layer 10B is. The plurality of second regions 14 of the first light diffusing layer 10A (each being a rectangular region) are arranged in a stripe pattern along a horizontal direction of the liquid crystal display panel 20. The plurality of second regions 14 of the second light diffusing layer 10B (each being a rectangular region) are arranged in a stripe pattern along a vertical direction of the liquid crystal display panel 20. The polarization axis of one of a pair of polarizing plates (not shown) extends in the horizontal direction, and the polarization axis of the other extends in the vertical direction. The liquid crystal display panel 20 may be of the above-described VA mode or may be of any other display mode.

The first light diffusing layer 10A is provided on the viewer side of the liquid crystal display panel 20 with a base film 16 interposed therebetween as shown in FIG. 11(a). The second light diffusing layer 10B may be provided over the first light diffusing layer 10A with a base film interposed therebetween. However, to prevent occurrence of overlapping images, a base film preferably does not intervene between the second light diffusing layer 10B and the first light diffusing layer 10A.

In FIG. 11(a), in consideration of the total distance of L and H (the height of the low refractive index regions 14), a can be described as tan θ'*(L+H). Thus, as the value of L+H decreases, a decreases so that overlapping images are less likely to be visually perceived. The light diffusing layer 10A, which is closer to the liquid crystal display panel 20, can have a smaller L+H distance than the light diffusing layer 10B, and therefore can make overlapping images in the horizontal direction less perceivable.

Human eyes lie side by side and are therefore more likely to perceive overlapping images in the horizontal direction. As such, in a liquid crystal display device of an embodiment of the present invention, to make overlapping images less perceivable, the first light diffusing layer 10A which includes vertically-extending low refractive index regions that are arranged in a stripe pattern along the horizontal direction is provided on a side closer to the liquid crystal display panel 20. As a matter of course, the above-described distance a is preferably 250 μm or less, more preferably 150 μm or less. Overlapping images can be made less perceivable by at least providing the first light diffusing layer 10A, which includes vertically-extending low refractive index regions that are arranged in a stripe pattern along the horizontal direction, on the side closer to the liquid crystal display panel 20. This arrangement may be used together with other countermeasures which will be described below, whereby visual perception of overlapping images can be prevented even when the above-described distance a is more than 250 μm.

Note that the value of L in the light diffusing layer 10B includes, as shown in FIG. 11(a), the glass substrate 20a on the viewer side of the liquid crystal display panel 20, a polarizing plate (not shown), the base film 16, and the light diffusing layer 10 of the light diffusing layer 10A. Therefore, L of the light diffusing layer 10B is necessarily greater than L of the light diffusing layer 10A that is provided near the liquid crystal display panel 20. As a matter of course, the light diffusing layer 10B provided on the viewer side preferably meets the above-described conditions.

Figure 12:
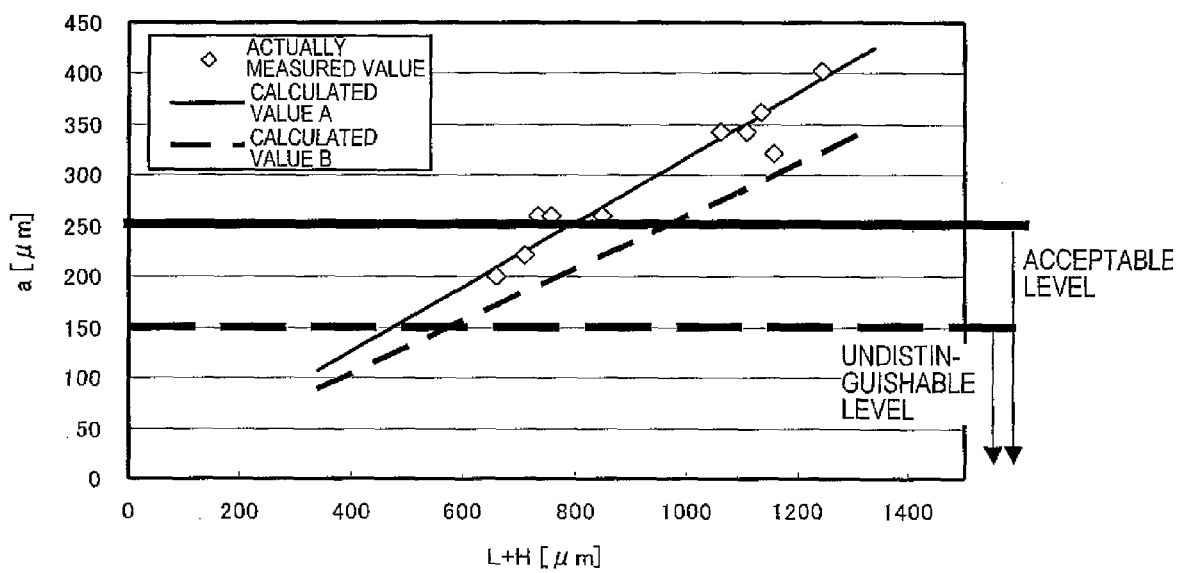
FIG. 12 A graph showing the thickness (L+H) dependence of position a where an overlapping image occurs, which was experimentally obtained.
Figure 13:
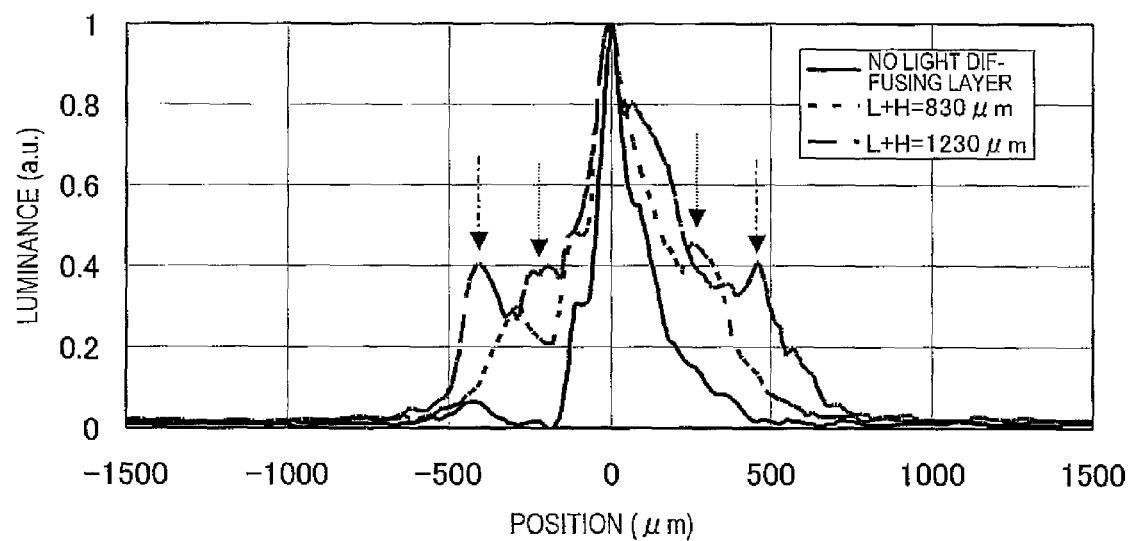
FIG. 13 A graph showing an example of line profiles which represent actual measurement results of overlapping images.

FIG. 12 is a graph showing the thickness (L+H) dependence of position a where an overlapping image occurs, which was experimentally obtained. FIG. 13 shows an example of line profiles which represent actual measurement results of overlapping images. In FIG. 13, the abscissa axis represents the position, and the ordinate axis represents the luminance. The graph of FIG. 12 was plotted based on the results shown in FIG. 13.

In FIG. 13, only one white display line was displayed (RGB were lighted) on the liquid crystal display device, the luminance of the white display line was detected using a CCD camera, and a cross-sectional profile of the luminance was measured by an image processing operation. FIG. 13 shows an example of three line profiles on the conditions of no light diffusing layer, L+H=830 μm, and L+H=1230 μm, although the actual measurement values were obtained from 10 different samples in total under the conditions where $L_1$ was any of 5 different values, 0 μm, 50 μm, 75 μm, 100 μm, and 190 μm, $L_2$ was any of two different values, 500 μm and 900 μm (the thickness of the polarizing plate was fixed at 200 μm), and $L_3$ was 30 μm. In FIG. 13, no overlapping image occurs in the case of no light diffusing layer. That is, a luminance peak which would correspond to an overlapping image does not occur. In the cases of L+H=830 μm and L+H=1230 μm, the profiles have luminance peaks that correspond to overlapping images, as indicated by down arrows in FIG. 13. Thus, a half of the distance between the overlapping image peaks in these luminance line profiles corresponds to a.

In FIG. 12, open diamonds (◇) represent actually measured values a with varying thickness L+H. The solid line represents the calculated value of a, which is a=tan θ'*(L+H). The value of θ' that was used in the calculation of values A and B of the graph was calculated from a luminance peak perceived at the position of polar angle θ' among the luminance peaks perceived at the positions of polar angle 0° and polar angle θ' (polar angle Δθ in the air) under a circumstance where collimated light comes into the light diffusing layer from the base side of the isosceles triangle of the low refractive index regions (from the upper side of FIG. 11(a)). Although θ' can be obtained by actual measurement as described above, θ' of a light beam which produces an overlapping image in a frontward direction (direction of polar angle 0° can be theoretically calculated by formula (9) show below:

$$\theta' = 90 - \sin^{-1}\left(\frac{N_2}{N_1} \times \cos\alpha\right) - \alpha \tag{9}$$

In FIG. 12, actually measured values correspond to $N_1$=1.59 and $N_2$=1.45. Calculated values A correspond to $N_1$=1.59 and $N_2$=1.45. Calculated values B correspond to $N_1$=1.59 and $N_2$=1.49. α is commonly 8°.

As for the actually measured values shown in FIG. 12, $L_1$ was any of the five values, 0 μm, 50 μm, 75 μm, 100 μm, and 190 μm. $L_2$ was any of the two values, 500 μm and 900 μm (the thickness of the polarizing plate is fixed at 200 μm). $L_3$ was 30 μm. Therefore, L was the sum of a combination of these values, resulting in 10 different actually measured values in total. H was 110 μm. As seen from FIG. 12, the actually measured values and calculated values A exhibit good coincidence. This coincidence can be a basis for a conclusion that calculated values B are also correct both quantitatively and theoretically.

As seen from FIG. 12, in the case of calculated values A, to adjust a to 150 μm or less, i.e., to adjust $\Theta_B$=tan$^{-1}$(a/Lb) to 1.0 arc minute (=one sixtieth (1/60) of one degree) or less where $\theta_B$ is an angle between an overlapping image ray and a real image ray and Lb is the viewing distance, total thickness L+H (sometimes denoted by "Lt") may preferably be not more than 480 μm. For example, a possible combination which allows L+H to be not more than 480 μm is 0 μm for $L_1$, 360 μm for $L_2$ (260 μm thick glass substrate and 100 μm thick polarizing plate), 10 μm for $L_3$, and 110 μm for H. As a matter of course, the present invention is not limited to this combination. Any combination is acceptable so long as L+H is 480 μm or less. In the case of calculated values B, in order to adjust a to 150 μm or less, total thickness L+H is preferably 600 μm or less. In this case also, the present invention is not limited to this combination, and any combination is acceptable.

It is also understood from the result of the subjective evaluation that, to adjust a to 250 μm or less, i.e., to adjust $\theta_B$ to 1.7 arc minutes or less, total thickness L+H for calculated values A is preferably 800 μm or less, and total thickness L+H for calculated values B is preferably 980 μm or less. In this case also, total thickness L+H may be realized by any combination. In the liquid crystal display device of the embodiment of the present invention which is shown in FIG. 3, when the light diffusing layer 10A meets this condition, the viewing angle characteristics in the upper, lower, rightward, and leftward directions can be improved, and occurrence of overlapping images in the rightward and leftward directions can be effectively prevented.

The liquid crystal display device of the embodiment of the present invention which is shown in FIG. 3 includes two light diffusing layers 10A and 10B. Therefore, in this case, the total thickness ($2L_1+L_2+2L_3+2H$) may more preferably be not more than the values shown above for the respective cases. In this case also, any combination may be acceptable. Such a configuration can improve the viewing angle characteristics in the rightward and leftward directions and effectively prevent occurrence of overlapping images in the rightward and leftward directions as well as effectively prevent occurrence of overlapping images in the upper and lower directions. Thus, the display characteristics do not degrade in any azimuth.

As appreciated from formula (9) shown above, the above-described value varies as the values of $N_1$ and $N_2$ are changed. Therefore, the optimum value of L+H may be determined depending on the configuration.

Note that the typical viewing distance of a liquid crystal display device depends on the use of the device. For example, in monitor applications, it is about 50 cm. Also, it can be generally said that the typical viewing distance of the liquid crystal display device may be longer than a distance with which black matrix (BM) formed between pixels cannot be clearly distinguished. For example, for the BM width of 50 μm, the minimum viewing distance is 10 cm when $θ_B$ is 1.7 arc minutes. When $θ_B$ is 1.0 arc minute, the minimum viewing distance is 18 cm.

(Other Countermeasure 1)

Occurrence of overlapping images can be effectively prevented by mixing a material which has the property of absorbing visible light in the low refractive index regions 14 in order to absorb light which comes in the low refractive index regions 14. The material which absorbs visible light may preferably be for example, carbon black or a mixture of a blue pigment and a red pigment. The visible light absorbance is preferably 95% or more, and more preferably 99% or more.

(Other Countermeasure 2)

To prevent light which comes in the low refractive index regions 14 from outgoing in a direction perpendicular to the display surface, refraction of the light at the low refractive index regions 14 is prevented. This may be accomplished so long as the following condition, which is transformed from formula (2) on the assumption that total reflection occurs n times, is met.

$$N_1 \cos\left(\sin^{-1}\left(\frac{\sin\Delta\theta}{N_1}\right) + n\alpha\right) > N_2$$

(n is an integer not less than 1)

For example, when $N_1=1.55$, $N_2=1.40$, $α=8.0°$, and $n=1$, $Δθ$ is about 27°. Therefore, by limiting all the light beams emitted from the backlight unit to 27° or less, overlapping images can be extremely decreased. When light of n=2 is further considered, overlapping images cannot be visually perceived in principle by limiting all the light beams from the backlight unit to 13° or less.

Other Countermeasures 1 and 2 may be employed separately from the previously-described countermeasure (the countermeasure of setting a so as not to exceed a predetermined value). Alternatively, any two or more of these countermeasures may be employed in combination. To solve the above-described problem of overlapping images, increasing the directivity of the backlight (decreasing the half-value angle) may be preferable. However, if the directivity of the backlight is excessively increased, the peaks of once-totally-reflected light and twice-totally-reflected light are conspicuous as shown in FIG. 5(a), resulting in a sense of discontinuity in the viewing angle characteristics. Thus, a combination of the countermeasure of setting a so as not to exceed a predetermined value and Other Countermeasure 1 is preferable because this combination can prevent both the problem illustrated in FIG. 5(a) and occurrence of overlapping images.

As described above, only by providing a light diffusing layer that utilizes total reflection on the viewer side of the liquid crystal display panel, the viewing angle characteristics of the γ characteristic of a VA mode liquid crystal display device can be improved. Further, the distance from the liquid crystal layer to the second major surface of the light diffusing layer can be controlled, and the overlapping image problem can be solved by Other Countermeasures 1 and 2. However, the present inventor found the problem of a local chromaticity change (a blue shift in chromaticity at a certain polar angle) in the polar angle dependence of the viewing angle. This problem is specific to a case where the light diffusing layer is applied to the direct-viewing type.

This problem is due to the fact that the backlight unit used herein emits diffused light as well as the fact that refractive index $N_1$ of the first substance and refractive index $N_2$ of the second substance have wavelength dispersion. Specifically, the problem is due to the fact that, as for a light beam Δθ which is emitted from the backlight unit and transmitted through the liquid crystal display panel to enter the first region (refractive index $N_1$) of the light diffusing layer, whether or not the light meets formula (2) (discussed above) at a sloped interface between the first region and the second region (refractive index $N_2$) depends on the wavelength of the light.

Specifically, even at the same angle of incidence, whether the reflection is total reflection or partial reflection depends on the wavelength of the incident light. In the case of partial reflection, part of the light is refracted at the interface to enter the second region. This is due to the fact that the refractive indices of materials themselves have wavelength dispersion (wavelength dependence). For example, when the light diffusing layer of $N_1=1.59$, $N_2=1.50$, and $α=8.0°$ is used, a light beam emitted from the backlight unit with an inclination of about 30° passes through the liquid crystal display panel and then travels through the first region with θ'=about 18° before outgoing toward the viewer side with an inclination of about 60°. At the interface between the first region and the second region, total reflection does not occur in the whole wavelength range, i.e., partial reflection occurs in some wavelength bands. Therefore, the reflectance depends on the wavelength, and the spectrum of light radiated from the backlight unit changes as it passes through the light diffusion sheet and outgo toward the viewer side, resulting in a change in colors.

Formula (2), which represents the total reflection condition, can be transformed to the following formula:

$$\cos(\theta' + \alpha) > \frac{N_2(\lambda)}{N_1(\lambda)}$$

where λ is the wavelength. Since the refractive index is a function of the wavelength, whether or not total reflection occurs depends on the wavelength. Note that, when the wavelength dependence is not considered, the refractive index is represented by a refractive index for the light at the wavelength of 550 nm.

When the total reflection condition defined by the above formula is not met, partial reflection occurs. Therefore, under a circumstance where the polarization of the light is s-polarization, reflectance R is as follows:

$$R = \left(\frac{N_1(\lambda) \cdot \cos(90 - \theta' - \alpha) - N_2(\lambda) \cdot \cos\theta_3}{N_1(\lambda) \cdot \cos(90 - \theta' - \alpha) + N_2(\lambda) \cdot \cos\theta_3}\right)^2$$

$$= \left(\frac{\frac{N_1(\lambda)}{N_2(\lambda)} \cdot \sin(\theta' + \alpha) - \cos\theta_3}{\frac{N_1(\lambda)}{N_2(\lambda)} \cdot \sin(\theta' + \alpha) + \cos\theta_3}\right)^2$$

where $\theta_3$ is the angle of refraction which occurs when the light enters the second region. This gives $$\theta_3 = \sin^{-1}\left[\frac{N_1(\lambda)}{N_2(\lambda)} \cdot \cos(\theta' + \alpha)\right].$$

$\theta_3=90°$ corresponds to total reflection. Thus, if the ratio of $N_1$ to $N_2$ is constant irrespective of the wavelength, reflectance R does not depend on the wavelength. So long as reflectance R does not depend on the wavelength, the spectrum of light emitted from the backlight unit is not changed by reflection at the interface 12s between the high refractive index region 12 and the low refractive index regions 14, so that the display colors do not vary.

The wavelength dispersion of the refractive index of materials generally includes "no wavelength dispersion" (the refractive index is substantially constant irrespective of the wavelength), "normal dispersion" (the refractive index decreases as the wavelength increases), and "anomalous dispersion" (the refractive index increases as the wavelength increases). Among these, "no wavelength dispersion" and "normal dispersion" mainly occur. The wavelength dispersion of the refractive index can be described by the Cauchy's dispersion formula.

A local blue shift in chromaticity (at aforementioned polar angle 60°) in the polar angle dependence of the viewing angle characteristics discussed herein remarkably occurs in a combination of "normal dispersion" and "normal dispersion" or a combination of "normal dispersion" and "no wavelength dispersion". This is because, if both $N_1$ and $N_2$ have normal dispersion, the difference in refractive index between $N_1$ and $N_2$ decreases as the wavelength increases. Specifically, as the wavelength increases, the probability of meeting the relationship defined by the formula $\cos(\theta'+\alpha)>((N_2(\lambda))/(N_1(\lambda)))$ decreases. Therefore, the reflectance decreases as the wavelength increases. Thus, when light passes through the light diffusing layer, the spectrum of the light varies. In this case, a blue shift in chromaticity occurs.

When the wavelength dispersion of the refractive index is considered, using materials with no wavelength dispersion for both $N_1$ and $N_2$ is desirable for maintaining the ratio of $N_1$ to $N_2$ constant. When normal dispersion materials are used for both $N_1$ and $N_2$, the materials may be selected such that the ratio of $N_1$ to $N_2$ is constant in the visible light wavelength range (not less than 400 nm and not more than 800 nm). Specifically, the difference between the maximum and the minimum of $N_1/N_2$ in the visible light wavelength range may be not more than 0.02 of the average of $N_1/N_2$ in the visible light wavelength range. Such materials may be selected as necessary.

Alternatively, by setting the refractive indices so as to meet the twice-total-reflection condition, such as a combination of $N_1=1.59$ and $N_2=1.40$, a blue shift in chromaticity can be prevented without maintaining the ratio of $N_1$ to $N_2$ constant in the visible light wavelength range.

Although the description has been provided herein with an example of s-polarization, the same also applies to p-polarization.

Thus, as understood from the foregoing, the viewing angle characteristics of the γ characteristic of a VA mode liquid crystal display device can be improved only by providing a light diffusing layer that utilizes total reflection on the viewer side of the liquid crystal display panel. Further, the distance from the liquid crystal layer to the second major surface of the light diffusing layer can be controlled, and the overlapping image problem can be solved by Other Countermeasures 1 and 2. Furthermore, a local chromaticity change in the polar angle dependence of the viewing angle characteristics can be prevented by maintaining the ratio of $N_1$ to $N_2$ constant irrespective of the wavelength.

The light diffusing layer of an embodiment of the present invention includes a plurality of low refractive index regions which are arranged at a predetermined pitch in at least one direction as described above. As well known, if periodic structures having slightly different pitches are stacked one on the other, moiré is generated. Therefore, if the pitch of the periodic structure formed by the low refractive index regions of the light diffusing layer and the pitch of the periodic structure of the pixels of the liquid crystal display panel are slightly different, moiré may be generated. To effectively prevent generation of moiré without degrading the display quality, the pitch of the periodic structure formed by the low refractive index regions is preferably not more than three quarters of the arrangement pitch of the pixels in the same direction, and two or more low refractive index regions are preferably placed within the extent of the opening of a pixel. The arrangement direction of the low refractive index regions preferably has an inclination of 1° or more relative to a bus line of the liquid crystal display panel (a gate bus line, a source bus line, and/or a CS bus line).

The liquid crystal display device 110 shown in FIG. 3 includes the light diffusing layers 10A and 10B as described above. The light diffusing layer 10A, which is closer to the liquid crystal display panel 20, includes a plurality of vertically-extending rectangular second regions (low refractive index regions) 14 which are arranged in a stripe pattern along a horizontal direction. The light diffusing layer 10B, which is closer to the viewer side, includes a plurality of horizontally-extending rectangular second regions 14 which are arranged in a stripe pattern along a vertical direction. The light diffusing layer 10A improves the viewing angle characteristic in the horizontal direction. The light diffusing layer 10B improves the viewing angle characteristic in the vertical direction.

Figure 14:
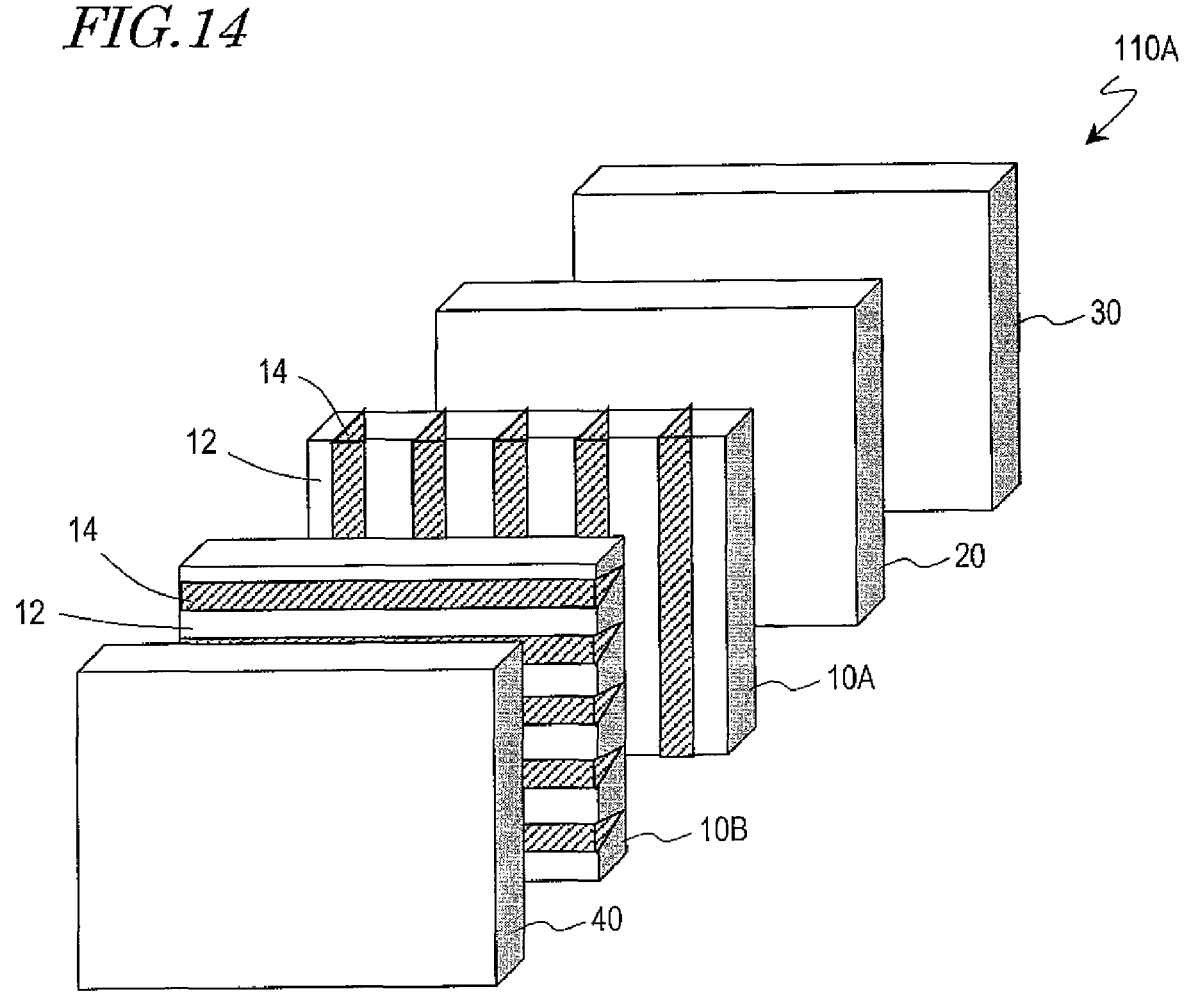
FIG. 14 A schematic exploded perspective view of another liquid crystal display device 110A of an embodiment of the present invention.

Alternatively, as in a liquid crystal display device 110A shown in FIG. 14, a light scattering layer (diffuse reflection layer) 40 may be provided on the viewer side of the light diffusing layer 10B of the liquid crystal display device 110. The light scattering layer 40 may be formed of, for example, a material composed of a resin and particles dispersed therein, the particles having a different refractive index from that of the resin. The light scattering layer 40 may function as an antiglare layer. As a matter of course, as described above, the viewer side of the light diffusing layer 10B may be provided with another element, such as an antireflection layer, a low reflection layer, or a reflection preventing layer. As a matter of course, any two or more of these elements may be used in combination when necessary.

INDUSTRIAL APPLICABILITY

The present invention is applicable to a wide variety of known liquid crystal display devices and is capable of improving the viewing angle characteristics.

The invention claimed is:

1. A liquid crystal display device, comprising:
a liquid crystal display panel which has a pair of polarizing plates; and
first and second light diffusing layers, each of which has a first major surface and a second major surface opposing each other and each of which is arranged such that the first major surface opposes a viewer side surface of the liquid crystal display panel; wherein
each of the first and second light diffusing layers includes a first region formed of a first substance which has a first refractive index $N_1$ and a plurality of second regions formed of a second substance which has a second refractive index $N_2$, the second refractive index $N_2$ being smaller than the first refractive index $N_1$;
the plurality of second regions are arranged in the first region at a predetermined pitch P in one direction in a plane parallel to the second major surface, and each of the plurality of second regions forms a plurality of interfaces with the first region, the interfaces being inclined by $\alpha°$ from a normal of the second major surface;
the first light diffusing layer is closer to the liquid crystal display panel than the second light diffusing layer is, and the plurality of second regions of the first light diffusing layer are arranged in a stripe pattern along a horizontal direction of the liquid crystal display panel;
each of the second regions of the first and second light diffusing layers is approximated to an isosceles triangle where a base is on the second major surface side, a vertex is on the first major surface side, and a vertex angle is $2\alpha$; and
formulae shown below are met:

$$H \leq \frac{P}{\tan 2\alpha + \tan \alpha}$$

and $$\cos[\alpha(2n-1)] > \frac{N_2}{N_1}$$

where H is a height of the isosceles triangle, and n is an integer not less than 2.

2. A liquid crystal display device, comprising:
a liquid crystal display panel which has a pair of polarizing plates; and
first and second light diffusing layers, each of which has a first major surface and a second major surface opposing each other and each of which is arranged such that the first major surface opposes a viewer side surface of the liquid crystal display panel; wherein
each of the first and second light diffusing layers includes a first region formed of a first substance which has a first refractive index $N_1$ and a plurality of second regions formed of a second substance which has a second refractive index $N_2$, the second refractive index $N_2$ being smaller than the first refractive index $N_1$;
the plurality of second regions are arranged in the first region at a predetermined pitch P in one direction in a plane parallel to the second major surface, and each of the plurality of second regions forms a plurality of interfaces with the first region, the interfaces being inclined by $\alpha°$ from a normal of the second major surface;
the first light diffusing layer is closer to the liquid crystal display panel than the second light diffusing layer is, and the plurality of second regions of the first light diffusing layer are arranged in a stripe pattern along a horizontal direction of the liquid crystal display panel; and
a difference between a maximum and a minimum of $N_1/N_2$ in a wavelength range from 400 nm to 800 nm is not more than 0.02 of an average of $N_1/N_2$ in the wavelength range.

3. The liquid crystal display device of claim 1, wherein the second regions further include a substance which absorbs visible light.

4. A liquid crystal display device, comprising:
a liquid crystal display panel which has a pair of polarizing plates; and
first and second light diffusing layers, each of which has a first major surface and a second major surface opposing each other and each of which is arranged such that the first major surface opposes a viewer side surface of the liquid crystal display panel; wherein
each of the first and second light diffusing layers includes a first region formed of a first substance which has a first refractive index $N_1$ and a plurality of second regions formed of a second substance which has a second refractive index $N_2$, the second refractive index $N_2$ being smaller than the first refractive index $N_1$;
the plurality of second regions are arranged in the first region at a predetermined pitch P in one direction in a plane parallel to the second major surface, and each of the plurality of second regions forms a plurality of interfaces with the first region, the interfaces being inclined by $\alpha°$ from a normal of the second major surface;
the first light diffusing layer is closer to the liquid crystal display panel than the second light diffusing layer is, and the plurality of second regions of the first light diffusing layer are arranged in a stripe pattern along a horizontal direction of the liquid crystal display panel; and
the predetermined pitch P is not more than three quarters of a pixel pitch in the direction.

5. The liquid crystal display device of claim 1, further comprising a light scattering layer on a viewer side of the second light diffusing layer.

6. The liquid crystal display device of claim 1, wherein the plurality of second regions of the second light diffusing layer are arranged in a stripe pattern along a vertical direction of the liquid crystal display panel.

7. The liquid crystal display device of claim 2, wherein the plurality of second regions of the second light diffusing layer are arranged in a stripe pattern along a vertical direction of the liquid crystal display panel.

8. The liquid crystal display device of claim 2, wherein the second regions further include a substance which absorbs visible light.

9. The liquid crystal display device of claim 2, further comprising a light scattering layer on a viewer side of the second light diffusing layer.

10. The liquid crystal display device of claim 4, wherein the plurality of second regions of the second light diffusing layer are arranged in a stripe pattern along a vertical direction of the liquid crystal display panel.

11. The liquid crystal display device of claim 4, wherein the second regions further include a substance which absorbs visible light.

12. The liquid crystal display device of claim 4, further comprising a light scattering layer on a viewer side of the second light diffusing layer.

* * * * *